United States Patent
Gjoka et al.

(10) Patent No.: US 10,179,842 B2
(45) Date of Patent: Jan. 15, 2019

(54) NON-DEWETTING POROUS MEMBRANES

(71) Applicants: ENTEGRIS, INC., Billerica, MA (US); SOLVAY SOLEXIS S.p.A., Bollate (MI) (IT)

(72) Inventors: Alketa Gjoka, Medford, MA (US); Ven Anantha Raman, Salem, NH (US); Matthias Gebert, Saronna (IT); Claudio Oldani, Bareggio (IT); Alessandro Ghielmi, Milan (IT)

(73) Assignee: Entegris, Inc., Billerica, MA (US)

( * ) Notice: Subject to any disclaimer, the term of this patent is extended or adjusted under 35 U.S.C. 154(b) by 79 days.

(21) Appl. No.: 15/010,282

(22) Filed: Jan. 29, 2016

(65) Prior Publication Data
US 2016/0144322 A1    May 26, 2016

Related U.S. Application Data

(62) Division of application No. 13/262,743, filed as application No. PCT/US2010/029344 on Mar. 31, 2010, now Pat. No. 9,359,480.
(Continued)

(51) Int. Cl.
*B01D 71/32* (2006.01)
*B01D 71/36* (2006.01)
(Continued)

(52) U.S. Cl.
CPC ............ *C08J 3/098* (2013.01); *B01D 65/10* (2013.01); *B01D 67/0006* (2013.01);
(Continued)

(58) Field of Classification Search
None
See application file for complete search history.

(56) References Cited

U.S. PATENT DOCUMENTS

| 4,035,565 A | 7/1977 | Apotheker et al. |
| 4,243,770 A | 1/1981 | Tatemoto et al. |

(Continued)

FOREIGN PATENT DOCUMENTS

| CN | 1371935 A | 10/2002 |
| CN | 1913946 A | 2/2007 |

(Continued)

OTHER PUBLICATIONS

Arcella, A., et al., "New Peroxide Curable Perfluoroelastomer for High Temperature Applications", *Presented at a meeting of the Rubber Division, Am. Chem. Soc.*, pp. 1-23 (May 5-8, 1998).
(Continued)

*Primary Examiner* — Krishnan S Menon
(74) *Attorney, Agent, or Firm* — Entegris, Inc.

(57) ABSTRACT

Microporous membrane composites that are non-dewetting are disclosed. These microporous membrane composites are wet with solutions of methanol and water and are non-dewetting following autoclave treatment in water. The microporous membrane composites comprise a microporous membrane support that is coated with a crosslinked ionomer comprising hydrophilic groups. Compared to the microporous membrane support, the microporous membrane composite has a flow loss on average in isopropyl alcohol of less than 82%.

19 Claims, 3 Drawing Sheets

Related U.S. Application Data

(60) Provisional application No. 61/166,879, filed on Apr. 6, 2009.

(51) Int. Cl.
*B01D 69/02* (2006.01)
*C08J 3/09* (2006.01)
*B01D 65/10* (2006.01)
*B01D 67/00* (2006.01)
*B01D 69/12* (2006.01)

(52) U.S. Cl.
CPC ......... *B01D 67/0088* (2013.01); *B01D 69/02* (2013.01); *B01D 69/125* (2013.01); *B01D 71/32* (2013.01); *B01D 71/36* (2013.01); *B01D 2323/02* (2013.01); *B01D 2323/30* (2013.01); *B01D 2323/40* (2013.01); *B01D 2325/20* (2013.01); *B01D 2325/36* (2013.01); *C08J 2327/12* (2013.01); *C08J 2327/18* (2013.01)

(56) References Cited

U.S. PATENT DOCUMENTS

| | | | |
|---|---|---|---|
| 4,470,859 A | 9/1984 | Benezra et al. | |
| 4,564,662 A | 1/1986 | Albin | |
| 4,618,533 A | 10/1986 | Steuck | |
| 4,694,045 A | 9/1987 | Moore | |
| 4,745,165 A | 5/1988 | Arcella et al. | |
| 4,943,622 A | 7/1990 | Naraki et al. | |
| 5,173,553 A | 12/1992 | Albano et al. | |
| 5,716,680 A | 2/1998 | Martin et al. | |
| 5,863,610 A | 1/1999 | Young et al. | |
| 5,928,792 A | 7/1999 | Moya | |
| 6,179,132 B1 | 1/2001 | Moya | |
| 6,197,903 B1 | 3/2001 | Maccone et al. | |
| 6,354,443 B1 | 3/2002 | Moya | |
| 6,576,100 B2 | 6/2003 | Arcella et al. | |
| 6,835,480 B2 | 12/2004 | Dykeman et al. | |
| 6,902,676 B2 | 6/2005 | Arcella et al. | |
| 7,034,082 B2 | 4/2006 | Michot et al. | |
| 7,094,469 B2 | 8/2006 | Moya | |
| 7,112,363 B2 | 9/2006 | Moya | |
| 7,288,600 B2 | 10/2007 | Moya | |
| 7,306,729 B2 | 12/2007 | Bacino et al. | |
| 7,381,331 B2 | 6/2008 | Duong et al. | |
| 9,359,480 B2 | 6/2016 | Gjoka et al. | |
| 2002/0014405 A1 | 2/2002 | Arcella et al. | |
| 2002/0040106 A1* | 4/2002 | Wlassics | C08F 8/18 525/326.4 |
| 2003/0171444 A1 | 9/2003 | Arcella et al. | |
| 2004/0024123 A1 | 2/2004 | Moya | |
| 2005/0164072 A1 | 7/2005 | Yan et al. | |
| 2007/0012624 A1 | 1/2007 | Bacino et al. | |
| 2007/0119774 A1 | 5/2007 | Yen | |
| 2008/0107945 A1 | 5/2008 | Coms et al. | |
| 2010/0087553 A1 | 1/2010 | Arcella | |
| 2010/0320142 A1 | 12/2010 | Ge et al. | |
| 2012/0118816 A1 | 5/2012 | Gjoka et al. | |

FOREIGN PATENT DOCUMENTS

| | | |
|---|---|---|
| EP | 01 136 596 B1 | 5/1988 |
| EP | 0 199 138 B1 | 2/1989 |
| EP | 0 410 351 B1 | 12/1994 |
| EP | 1004615 A2 | 5/2000 |
| EP | 1 238 999 B1 | 4/2006 |
| EP | 1 239 000 B1 | 11/2007 |
| JP | 2002008680 A | 1/2002 |
| JP | 3400459 | 4/2003 |
| JP | 2005054363 A | 3/2005 |
| JP | 2008266386 A | 11/2008 |
| WO | WO 95/24976 | 9/1995 |
| WO | WO 97/11492 | 3/1997 |
| WO | WO 97/40924 | 11/1997 |
| WO | WO 99/38897 | 8/1999 |
| WO | WO 00/61267 | 10/2000 |
| WO | WO 2005/072487 | 8/2005 |
| WO | WO 2007/011492 | 1/2007 |
| WO | WO 2007/126967 A2 | 11/2007 |
| WO | WO 2008/046816 A1 | 4/2008 |
| WO | WO 2010/117845 A2 | 10/2010 |

OTHER PUBLICATIONS

Arcella, V., et al., "Hyflon Ion Membranes for Fuel Cells", *Ind. Eng. Chem. Res.*, 44: 7646-7651 (2005).

International Search Report and Written Opinion of the International Searching Authority from counterpart International Application No. PCT/US2010/029344, dated Dec. 17, 2010.

Notification Concerning Transmittal of International Preliminary Report on Patentability from counterpart International Application No. PCT/US2010/029344, dated Oct. 20, 2011.

Search Report for Singapore Application No. 201107213-9; dated Dec. 7, 2013.

Souzy, R. et al., "Functional fluoropolymers for fuel cell membranes," Frog. Polym. Sci., 30: 644-687 (2005).

Won, S.Y., et al., "Wet Oxidation of Aqueous Polyvinyl Alcohol Solution", *Ind. Eng. Chems, Res.*, 40(1): 60-66 (2001).

\* cited by examiner

NON-DEWETTING POROUS MEMBRANES

RELATED APPLICATIONS

This application is a divisional of U.S. application Ser. No. 13/262,743, which is the U.S. National Stage of International Application No. PCT/US2010/029344, filed on Mar. 31, 2010, published in English, which claims the benefit of U.S. Provisional Application No. 61/166,879, filed on Apr. 6, 2009. The entire teachings of the above applications are incorporated herein by reference.

BACKGROUND

Porous membranes are used to filter various liquids and gases and remove contaminants such as particles, tissue debris, cells, microorganisms, bubbles, gel particles and the like from these fluids. These porous membranes can be formed from a polymeric composition, metals, ceramics and/or biological composition and can have a controlled and measurable porosity, a pore size and pore size distribution, and specified thickness. The porous membranes can be used alone or may be incorporated into a filter device such as a cartridge which can be inserted within a fluid stream to effect removal of particles and the like from the fluid.

Porous membranes are chemically resistant to the fluid being filtered and maintain the membrane's strength, porosity, chemical integrity, and cleanliness during filtration. For example, in the manufacture of microelectronic circuits, filters made from polymeric porous membranes are used to purify various corrosive or chemically active process fluids (liquids, supercritical fluids, and gases) to prevent particulate contaminants from causing defects and circuit failures. Fluid filtration or purification is usually carried out by passing the process fluid through the porous membrane from a zone of higher pressure on the upstream side of the porous membrane to a zone of lower pressure on the downstream side of the porous membrane. Thus, liquids, gases, and even supercritical fluids being filtered in this fashion experience a pressure drop across the porous membrane filter.

For liquids, this pressure drop or differential pressure across the porous membrane can result in the liquid on the upstream side of the porous membrane having a higher level of dissolved gases than the liquid on the downstream side of the porous membrane. The change in gas solubility and or gas compressibility in the liquid occurs because gases, such as air, have greater solubility in liquids at higher pressure compared with liquids at lower pressure. As the liquid passes from the upstream side of the membrane filter to the downstream side, dissolved gases can form bubbles, nucleate on particles or surface defects, or come out of solution in the membrane resulting in outgassing of the liquid. Liquids that can outgas, outgassing liquids, are commonly used in the manufacture of semiconductors and microelectronic devices and can include for example water, hydrogen peroxide, SC1 and SC2 cleaning baths, ozonated water, organic solvents such as alcohols, photoresists and antireflective coatings, developers, other aqueous acids and bases which can optionally contain an oxidizer, and salt containing solutions such as a buffered oxide etch (BOE).

A hydrophobic porous membrane is not directly wet with water and has a contact angle greater than 90 degrees for a water drop on the porous membrane. Filtration of outgassing liquids with a hydrophobic porous membrane can result in the dissolved gases coming out of the liquid at sites and surfaces on the hydrophobic membrane including the interior pore surfaces and the exterior or geometric surfaces. The hydrophobic porous membrane has greater affinity for the gas than the liquid. The gas that comes out of the liquid can accumulate and form gas pockets which adhere to the hydrophobic porous membrane surfaces and pores. As these gas pockets grow in size due to continued liquid outgassing, they begin to displace liquid from the pores of the hydrophobic porous membrane, ultimately reducing the effective filtration area of the hydrophobic porous membrane. This phenomenon is usually referred to as dewetting of the hydrophobic porous membrane since the fluid-wetted, or fluid-filled portions of the hydrophobic porous membrane are gradually converted into fluid-nonwetted, or gas-filled portions. Where dewetting occurs in a hydrophobic porous membrane, filtration in this portion of the membrane ceases with the result being a reduction of the overall filtration efficiency of the filter.

Chemically inert filter materials like Teflon® can be used to prevent membrane degradation in corrosive and chemically active fluids. Filter membranes that are incompatible with such fluids can undergo degradation which can lead to the chemical breakdown of the membrane composition. Membrane degradation may result in extractable materials being released from the filter during use, thus compromising the purity, integrity and cleanliness of the fluid being filtered. Membrane filters made from fluorine-containing polymers such as PTFE (polytetrafluoroethylene), or PFA (polytetrafluoroethylene-co-perfluoroalkoxy vinyl ether) can be utilized in these applications. Fluorine-containing polymers are well known for their chemical inertness and excellent resistance to chemical attack. One disadvantage of fluorine-containing polymers is that they are hydrophobic and therefore porous membranes made from such polymers are difficult to wet with aqueous liquids or other fluids which have surface tensions greater than the surface energy of the membrane. In order to wet the surface of a hydrophobic membrane with water or an aqueous fluid, it is current practice to first wet the membrane surfaces with low surface tension organic solvents such as isopropyl alcohol, followed by contact of the porous membrane surface with a mixture of water and an organic solvent which is then followed by contact of this exchanged membrane with water or an aqueous fluid. This process can create large volumes of solvent waste that must be disposed of and can consume large amounts of water due to the additional flushing of the filter cartridge with water. Alternatively, hydrophobic membranes can be wet with water under pressure. This pressure intrusion process is time consuming, expensive and ineffective for tight pore membranes, and can results in the rupture of thin porous membranes. Moreover, this process does not ensure that a substantial portion of the pores in the membrane are completely intruded with water.

In contrast to hydrophobic porous membranes, hydrophilic porous membranes are spontaneously wet upon contact with an aqueous liquid so that a treatment process for wetting the membrane surfaces is not used. That is, no prior treatment with an organic solvent or pressure intrusion, or mechanical energy such as by stirring is used in order for the hydrophilic membrane surface to be wet with water.

Moya, in U.S. Pat. No. 6,354,443 which is incorporated herein by reference in its entirety, discloses the modification and characterization of a porous membrane such as a polyperfluorocarbon membrane modified with a bound perfluorocarbon copolymer composition to render the entire surface non-dewetting. A porous membrane substrate or support is contacted with a perfluorocarbon copolymer composition in a solvent or diluent. Excess perfluorocarbon copolymer composition is removed from the surface with a solvent or diluent for the copolymer. The solvent or diluent does not remove the perfluorocarbon copolymer composition bound to the membrane surface. The membrane having the copolymer composition bound to its surface is then heat treated to improve the bond between the membrane substrate and the surface modifying perfluorocarbon copolymer composition. The perfluorocarbon copolymer composition is utilized in concentrations and amounts so that the membrane surface is completely modified while avoiding substantial blocking or plugging of the membrane pores. The surface modified porous membranes have a pressure drop that does not exceed an increase of greater than 25% as compared to the pressure drop across the unmodified membrane. Complete surface modification can be determined by staining with Methylene Blue dye.

Steuck in U.S. Pat. No. 4,618,533 discloses a composite porous membrane formed from a porous polymeric membrane on which is directly coated a cross-linked polymer that is not fluorinated. The composite porous membrane retains the porosity of the porous polymeric membrane. The composite porous membrane is formed from a porous polyvinylidene fluoride membrane which is directly coated with a polymer formed of a monomer and cross-linked with hydroxyalkyl acrylate.

Moya in U.S. Pat. No. 5,928,792 discloses a process for producing a porous membrane product having its surface completely modified with a perfluorocarbon copolymer composition. The porous membrane substrate is contacted with a solution containing a perfluorocarbon copolymer composition to bind the composition onto the substrate surface. The substrate is subjected to a mechanical force to remove excess perfluorocarbon copolymer composition and then is heat treated.

Moya in U.S. Pat. No. 6,179,132 discloses a porous membrane which is formed from a porous polyperfluorocarbon membrane substrate having its surface modified with a perfluorocarbon polymer composition. The modified surface is directly wet with water.

Moya in U.S. Pat. No. 7,094,469 discloses a porous or non-porous membrane or article formed from a fluorine-containing polymer substrate having its surface modified with an immobilized, such as by crosslinking and/or grafting, fluorocarbon having hydrophilic functional groups to provide a surface with improved hydrophilic characteristics as compared to the unmodified substrate. The modified surface is non-dewetting after being wet with an aqueous fluid or is directly wetted by an aqueous fluid. The fluorine-containing polymer substrate can be a porous membrane or can be a non-porous article. The immobilized fluorocarbon is formed from a monomer having formula: [T-SO$_2$Y— SO$_2$T']$^-$M$^+$ in which T and T' are identical or different and comprise an organic radical bearing at least one active polymerization function such as an unsaturation or a ring that can be opened; -M$^+$ comprises an inorganic cation.

Moya in U.S. Pat. No. 7,112,363 discloses a porous or non-porous membrane or article formed from a fluorine-containing polymer substrate having its surface modified with a crosslinked or branched fluorocarbon polymeric composition having hydrophilic functional groups to provide a surface with improved hydrophilic characteristics as compared to the unmodified substrate. The fluorine-containing polymer substrate can be a porous membrane or can be a non-porous article. The surface comprising a crosslinked fluorocarbon, such as perfluorocarbon, polymeric composition having hydrophilic functional groups is provided having connecting bridges or crosslinks having sulfonyl or carbonyl-containing groups joining polymeric chains.

Moya in U.S. Pat. No. 7,288,600 discloses a crosslinked fluorocarbon polymeric composition having hydrophilic functional groups, crosslinked with fluorinated crosslinking groups, formed from a fluorocarbon polymer precursor, which is thermally and chemically stable and which can be rendered more hydrophilic than its fluorocarbon polymer precursor. The crosslinked perfluorocarbon polymeric composition, which is crosslinked with perfluorinated crosslinking groups are stable against degradation by virtue of contact with highly reactive reagents such as liquid compositions containing a base such as ammonium hydroxide, an oxidizer such as hydrogen peroxide or ozone and water, having a pH greater than about 9 such as special cleaning (SC) solutions, for example SC1 used during the manufacture of electronic components. According to U.S. Pat. No. 7,288,600, crosslinking moieties containing non-perfluorinated organic groups become degraded upon contact with these reagents and these non-perfluorinated chemical crosslinks are destroyed so that the crosslinked polymer loses its original degree of crosslinking. The crosslinked fluorocarbon polymeric composition having hydrophilic functional groups are disclosed as having connecting bridges or crosslinks having sulfonyl or carbonyl-containing groups joining polymeric chains, which can include loops joining portions of a polymeric chain.

U.S. Pat. No. 6,902,676, incorporated herein by reference in its entirety, discloses porous hydrophilic membranes in its entirety, discloses porous hydrophilic membranes wettable by water, the hydrophilic membrane comprising a porous inert support on which an amorphous ionomer is impregnated, the hydrophilic membranes being characterized in that they have a water permeability higher than 1 l/(h m$^2$ atm), and in some cases higher than 500 l/(h m$^2$ atm); the ionomer being under amorphous form or with crystallinity below 5% and having the hydrophilic group in the acid form. Bistretched PTFE base Goretex membrane having a porosity of 0.2 microns and thickness of 40 microns is used. Membranes having a high permeability contain an impregnated ionomer amount from 0.5 to 10% by weight (support+ ionomer). When 20% by weight ionomer to 30% by weight ionomer is used membranes both partially and totally occluded to gases are found. This patent discloses that the (per)fluorinate ionomers can be crosslinked but that membranes obtainable by carrying out the crosslinking show a water permeability lower than the porous non-crosslinked ones, and this depends on the crosslinking entity. It is further disclosed that crosslinking allows an increase in the ionomer amount which coats the support walls. Two working examples in this patent describe the preparation of cross-linked porous membranes using fluorinated solvents with 16 wt % ionomer and 33 weight % ionomer of the total mass of the impregnated microporous membrane.

Benezra in U.S. Pat. No. 4,470,859 discloses a method for forming a hydrophilic coating upon a porous substrate such as a reticulate electrode or a filter from a dispersed, perfluorocarbon copolymer; the coating is not crosslinked. According to Benezra, the perfluorocarbon copolymer employed in such coatings should have an equivalent weight of not in excess of about 1500 so as to reasonably assure the presence of sufficient sulfonyl and/or carbonyl based or derived functional groups for providing hydrophilic properties to the porous or microporous substrate. Further, Benezra discloses where an abundance of functional groups are present per unit of copolymeric perfluorocarbon, the coating applied to a porous or microporous substrate may be excessively soluble in, for example, an aqueous fluid, or may be aggressively attacked by materials in contact with the coating. Benezra discloses that the equivalent weight of perfluorocarbon copolymer employed be not less than about 900 where pendent functionality of the copolymeric perfluorocarbon is carbonyl based or derived, and not less than about 950 where the pendent functionality is sulfonyl based or derived.

Benezra further discloses that the coating dispersion should be sufficiently viscous to be relatively readily retained within the microporous infrastructure while dispersion media is removed to leave a perfluorocarbon copolymeric coating upon substantially all surfaces of the infrastructure of a microporous substrate. According to Benezra, where, for viscosity or other reasons, it appears that dispersion or solution within the openly microporous substrate may flow out during dispersion media removal, utilization of tumbling techniques during removal of the dispersion media or solvent may assist in retaining perfluorocarbon copolymer within the infrastructure. Alternatively, Benezra discloses that deposition of the perfluorocarbon copolymer upon surfaces of the infrastructure of the microporous substrate can be enhanced by precipitating the copolymeric perfluorocarbon in situ within the infrastructure. Retention of such large amounts of coating on the membrane surfaces can lead to low water permeability, especially for microporous membranes with pore sizes of 0.2 microns or less.

U.S. Pat. No. 6,576,100 discloses crosslinked sulphonic fluorinated ionomers having an equivalent weight 380-1300 g/eq, comprising monomeric units deriving from one or more fluorinated monomers containing at least one ethylene unsaturation and from fluorinated monomeric units containing sulphonyl groups —$SO_2$ F in an amount such as to give the indicated equivalent weight. According to the disclosure, generally the larger the amount of sulphonic groups, ionomers having a lower equivalent weight, the better the efficiency of the ionomer in the application, both in terms of ion exchange capability in electrochemical applications, and in terms of the catalyst activity in catalysis applications. According to the disclosure, in electrochemical applications, for example in fuel cells, there is a direct correlation between the ionomer conductivity and the retention of water of the ionomer. According to this patent, the higher presence of ionic groups increased the ionic conductivity, and within certain limits, the amount of water that the polymer was able to keep.

Bacino in U.S. Pat. No. 7,306,729 discloses porous PTFE membranes that can be constructed as composite filters or composite vents, for example by layering the membrane with one or more additional layers that may provide support or protection to the membrane. The additional layer or layers may or may not be bonded to the membrane, depending on the end-use requirements. According to Bacino, these membranes can be rendered hydrophilic (water-wettable under little or no pressure) by various techniques making them usable in liquid filtration applications which involve, for example, filtration of aqueous fluids. According to the specification, a porous PTFE membrane was treated to render it hydrophilic by soaking in a solution of 1% polyvinyl alcohol (PVA) in a 50/50 mixture of isopropyl alcohol/deionized water. A PVA coating on a porous membrane would not be stable in oxidative, highly alkaline, and high temperature corrosive environments expected in cleaning baths used in semiconductor processing; a PVA coated porous membrane would therefore be expected to dewet and become hydrophobic during extended use in such baths.

Accordingly, there is a continuous need for microporous membranes with improved non-dewetting characteristics, that are wet with aqueous solutions containing reduced amounts of organic solvents, and that have good flow characteristics.

SUMMARY

It has been discovered that distributing fluorocarbon liquid compositions containing ionomers and crosslinkers, for example by using a roller coater, into a microporous membrane support results in a crosslinked coating of the ionomer on the microporous membrane that has less flow loss in a liquid compared to the flow loss in the same liquid of a microporous membrane support impregnated with the same fluorocarbon liquid composition. Further, the flow loss of microporous membrane supports coated by distribution of the fluorocarbon liquid composition can be varied reliably with the ionomer concentration in the fluorocarbon solvent. It has further been discovered that lower equivalent weight crosslinked ionomer coating distributed on the microporous membrane supports in versions of the invention are less wettable but have better flow loss properties compared to similar coatings distributed on microporous supports made with higher equivalent weight crosslinked ionomers.

Versions of the invention include microporous membrane composites that have a coating of a fluorocarbon liquid composition comprising fluorinated ionomer, radical initiator, and crosslinker, distributed and cured on the fluid contacting surfaces of a microporous membrane support. The microporous membrane supports can be activated to convert transformable functional groups of the ionomer into hydrophilic groups. The microporous membrane composites are non-dewetting following water autoclave and comprise a microporous membrane support on which at least one crosslinked amorphous ionomer with an equivalent weight of between 380 g/eq and 620 g/eq is distributed. The ionomer is distributed from a coating solution comprising a fluorocarbon solvent, fluorinated ionomer and/or fluorinated ionomer precursor, a radical initiator and crosslinker. The ionomer precursor in the coating solution is in an amount that coats the microporous membrane support surfaces and microporous membrane support pores with crosslinkable ionomer or crosslinkable ionomer precursor such that the final microporous membrane composite is wet with solutions containing methanol and water, is non-dewetting, and has a flow loss of 82% or less compared to the microporous membrane support. In some versions of the invention the microporous membrane composite has a water permeability of 1000 l/hour $m^2$ atm or more at 22.5° C.

One version of the invention comprises high surface area microporous membrane composites wettable with solutions containing methanol and water that are non-dewetting following autoclave treatment in water. The microporous membrane composites comprise a microporous membrane support with a coating on fluid contacting surfaces, the coating comprising ionomer(s) and crosslinking groups. The microporous membrane composite coating has a thickness whereby the microporous membrane composite has a flow loss on average in isopropyl alcohol of 82% or less based on the flow time on average in isopropyl alcohol for the uncoated microporous membrane where the rated pore size of the microporous membrane support is 0.45 microns or less and in some versions the pore size of the microporous membrane support is 0.2 microns or less. In some versions the microporous membrane support has a multilayer structure.

Another version of the invention is a microporous membrane composite that has a crosslinked coating comprising an amorphous fluorinated ionomer on the fluid contacting pores and surfaces of a microporous membrane support. The thin crosslinked coating on the microporous membrane support provides a microporous membrane composite that is non-dewetting by an autoclave test in water and can be characterized by a water permeability of greater than 1000 l/atm*hr*m$^2$ at or about 22.5° C. The coated microporous membrane composite can be wet with a solution containing methanol in water. In some versions of the invention the microporous membrane composite is wet by a solution containing methanol in water that has less than 80 wt % methanol, in some versions less than 60 wt % methanol, and in still other versions less than 35 wt % methanol, and in yet still other versions less than 15 wt % methanol in water. In some versions of the invention, the mass of coating on the surfaces of the microporous membrane support can be between about 25 weight percent to about 30 weight percent of the microporous membrane composite. In other versions of the invention, the mass of coating on the surfaces of the microporous membrane support can be between about 2 weight percent to about 30 weight percent of the microporous membrane composite. In versions of the invention the coated microporous membrane composite can have an ion exchange capacity of greater than 60 nanomoles/cm$^2$ and in some versions greater than 95 nanomoles/cm$^2$. The uniformity of the crosslinked ionomer coating on the microporous membrane support can be characterized by a mean of densitometry readings of the coated microporous membrane composite that has been stained with methylene blue dye and where the densitometry readings have a relative standard deviation of 0.4 or less. In some versions of the invention the crosslinked fluorinated ionomer coating can be characterized by the mean of densitometry readings of the coated microporous membrane composite stained with methylene blue dye after contact with hot IPA containing 5000 ppm 3M™ Novec™ FC 4432 fluorosurfactant. In some versions this mean is not different at the 95% confidence limit when compared with the mean densitometer readings of the coated microporous membrane composite stained with methylene blue dye before contact with hot IPA containing 5000 ppm of the fluorosurfactant; in some versions of the invention the difference between the densitometry means before and after treatment with hot isopropyl alcohol containing fluorosurfactant is between −9 percent and +9 percent.

Another version of the invention is a non-dewetting microporous membrane composite comprising a coating of crosslinked fluorinated ionomer, the crosslinking moieties do not contain hydrophilic groups, that coats the filtration surfaces of a microporous membrane support of pore size of 0.45 microns or less, in some cases a pore size of 0.2 microns or less, and in still other cases a pore size of 0.1 microns or less. The microporous membrane support comprises one or more support and/or retentive layers. In some versions of the invention the coating is from 2% by weight to 30% by weight of the microporous membrane composite, in other versions of the invention the mass of coating on the surfaces of the microporous membrane support can be between about 25 weight percent to about 30 weight percent of the microporous membrane composite. The microporous membrane composite has a flow loss on average in isopropyl alcohol that is 82% or less compared to a flow loss on average in isopropyl alcohol for the uncoated microporous membrane support when measured using 500 milliliters of isopropyl alcohol at a pressure of 97,905 Pa. In some versions of the invention the non-dewetting microporous membrane composite is characterized by having an isopropyl alcohol flow time on a 47 millimeter diameter sample of coated microporous membrane at a pressure of about 14.2 pounds per square inch (97905.6 Pa) that is less than 4700 seconds for 500 milliliters of isopropyl alcohol. The uniformity of the coating is such that densitometer readings of a microporous membrane composite stained with methylene blue has a mean densitometer value with a relative standard deviation of less than 0.4. The mean of densitometer readings of methylene blue stained coated microporous membrane composite after treatment in hot IPA and 5000 ppm fluorosurfactant bath for at least 4 hours is not different from the mean of the densitometry readings of the methylene blue stained coated microporous membrane composite prior to treatment. In some versions of the invention difference between the densitometry means before and after treatment with hot isopropyl alcohol containing fluorosurfactant is between −9 percent and +9 percent.

Versions of the invention include a fluorocarbon liquid composition comprising a fluorocarbon liquid medium containing a fluorinated ionomer dissolved or dispersed therein, at least 90% by weight of the fluorinated ionomer consisting in particles of size lower than 200 nanometers (nm), in some versions lower than 125 nm, in other versions lower than 40 nm, in still yet other version lower than 15 nm. In some versions of the invention the fluorinated ionomer has an equivalent weight of between 380 g/eq and 620 g/eq. The fluorinated ionomer comprises fluorinated monomer units containing ethylenic groups and functional groups transformable into hydrophilic groups, the transformable groups chosen from the groups consisting of —SO$_2$F, —COOR, —COF and combinations of these, wherein R is a $C_1$ to $C_{20}$ alkyl radical or a $C_6$ to $C_{20}$ aryl radical. The fluorinated ionomer further comprises monomeric units deriving from a bis-olefin, chosen among the formulae (OF-1), (OF-2), (OF-3) or combinations thereof, where (OF-1) is illustrated by the structure:

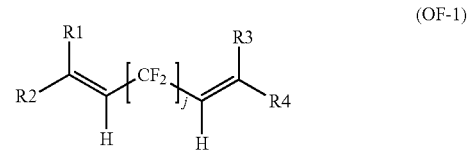

(OF-1)

where in the structure of (OF-1), j is an integer between 2 and 10, preferably between 4 and 8, and R1, R2, R3, R4, equal or different from each other, are H, F or $C_1$ to $C_5$ alkyl or (per)fluoroalkyl group. (OF-2) is illustrated by the structure:

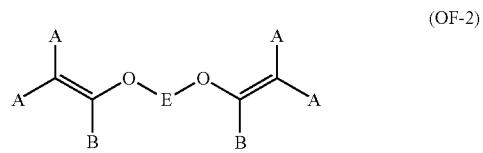

(OF-2)

where in the structure of (OF-2), each A can be equal or different from each other and at each occurrence, is independently selected from F, Cl, and H; each B can be equal or different from each other and at each occurrence, is independently selected from F, Cl, H and ORB, wherein RB is a branched or straight chain alkyl radical which can be partially, substantially or completely fluorinated or chlorinated; E is a divalent group having 2 to 10 carbon atom, optionally fluorinated, which may be inserted with ether linkages; preferably E is a —(CF$_2$)m-group, with m being an integer from 3 to 5; one version of a bis-olefin of (OF-2) type is F$_2$C═CF—O—(CF$_2$)$_5$—O—CF═CF$_2$. (OF-3) is illustrated by the structure:

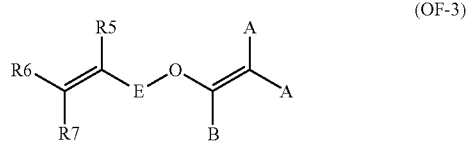

(OF-3)

where in the structure of (OF-3), E, A and B have the same meaning as above defined; R5, R6, R7, equal or different from each other, are H, F or C$_1$-C$_5$ alkyl or (per)fluoroalkyl group. In some versions of the invention the bis-olefin has the formula:

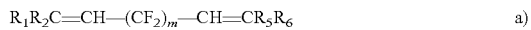

a)

wherein: m=2-10, R$_1$, R$_2$, R$_5$, R$_6$, are equal to or different from each other and are H or C$_1$-C$_5$ alkyl groups.

The fluorinated ionomer further comprises iodine and/or bromine atoms. In some versions of the invention the iodine and/or bromine atoms are in a terminal position of the ionomer primary chains, the iodine and/or bromine atoms coming from a fluorocarbon chain transfer agent of formula:

X$_1$(CF)$_n$X$_2$     b)

where X$_1$ and X$_2$ are chosen from the group consisting of I, Br, and combinations of these. In some versions of the invention the content of the iodine and/or bromine atoms is between 0.1% and 5% by weight based on the ionomer.

In some versions of the invention the fluorinated ionomer comprises monomeric units comprising tetrafluoroethylene, fluorinated monomeric units containing ethylenic groups and functional groups transformable into hydrophilic groups, the functional groups transformable into hydrophilic groups chosen from the groups consisting of —SO$_2$F, —COOR, —COF and combinations of these wherein R is a C$_1$ to C$_{20}$ alkyl radical or a C$_6$ to C$_{20}$ aryl radical. The fluorinated ionomer further comprises monomeric units deriving from a bis-olefin of formula:

c)

R$_1$R$_2$C═CH—(CF$_2$)$_m$—CH═CR$_5$R$_6$     d)

wherein: m is an integer between 2 and 10, R$_1$, R$_2$, R$_5$, R$_6$, are equal to or different from each other and are H or C$_1$-C$_5$ alkyl groups. The fluorinated ionomer further comprises iodine and or bromine atoms in a terminal position of the primary chains, the iodine and or bromine atoms coming from a fluorocarbon chain transfer agent of formula:

X$_1$(CF)$_n$X$_2$ where X$_1$ and X$_2$ are chosen from the group consisting of I, Br, and combinations of these.

In some versions of the invention the fluorinated monomeric units containing ethylenic groups and functional groups transformable into hydrophilic groups that have the formula:

CF$_2$═CF—O—CF$_2$CF$_2$SO$_2$F.

In versions of the invention the fluorocarbon liquid composition can additionally comprises a crosslinking agent and a radical initiator. In some versions of the invention the crosslinking agent can be or is a bis-olefin of formula:

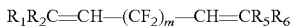

wherein: m=2 to 10, R$_1$, R$_2$, R$_5$, R$_6$, are equal to or different from each other and are H or C$_1$ to C$_5$ alkyl groups. The radical initiator can be or is an organic dialkyl peroxide and preferably is 2,5-di(t-butylperoxy)-2,5-dimethylhexane.

In some versions of the fluorocarbon liquid composition at least 95% by weight of the fluorinated ionomer can consist of particles of size lower than 200 nanometers (nm), in other versions lower than 125 nm, still other versions the fluorinated ionomer particle size is lower than 40 nm, and in still yet other versions the particle size is smaller or lower than 15 nm. In other versions of the liquid composition at least 99% by weight of the fluorinated ionomer can consist of particles of size lower than 200 nanometers (nm), in other versions lower than 125 nm, still other versions the particle size is lower than 40 nm, and in still yet other versions the particle size is smaller or lower than 15 nm. In still other versions of the invention the liquid composition has at least 99% by weight of the fluorinated ionomer that consists in particles of size lower than 125 nm. In yet still other version of the liquid composition at least 99% by weight of the fluorinated ionomer consist of particles of size lower than 40 nm. In still further versions of the liquid composition at least 99% by weight of the fluorinated ionomer consists in particles of size lower than 15 nm.

Another version of the invention is a fluorocarbon liquid composition comprising a fluorocarbon liquid medium containing a crosslinkable fluorinated ionomer dissolved or dispersed therein, at least 90% by weight of the crosslinkable fluorinated ionomer consisting in particles of size lower than 200 nm, preferably lower than 125 nm, more preferably lower than 40 nm, even more preferably lower than 15 nm. In some versions of the liquid composition, the liquid composition additionally comprises a crosslinking agent and a radical initiator.

Versions of the invention include microporous membrane supports coated with fluorocarbon liquid compositions. Another version of the invention is a microporous membrane support coated with the fluorocarbon liquid composition that is cured to crosslink the fluorinated ionomer and bis-olefin on the membrane. In still another version of the invention, the microporous membrane support with cured and crosslinked ionomer on its surfaces and pores has its transformable groups activated with base and acid to form the hydrophilic groups.

DESCRIPTION

Figure 1:
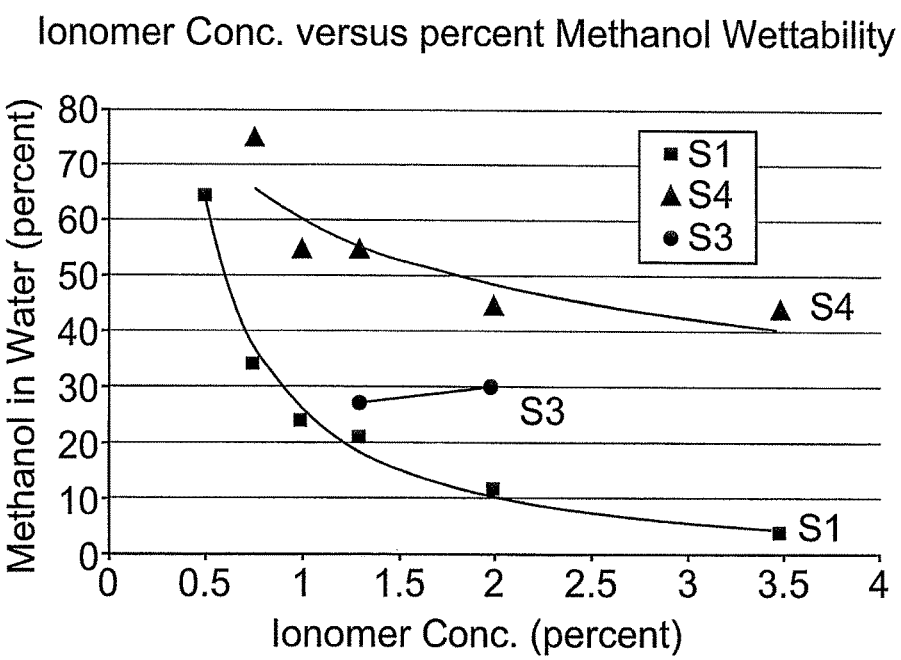
FIG. 1 Illustrates a graph of percent methanol in water (for solutions that wet the microporous membrane composites) versus the ionomer concentration used to coat the microporous membrane composite as described in Example 9.

While various compositions and methods are described, it is to be understood that this invention is not limited to the particular molecules, compositions, methodologies or protocols described, as these may vary. It is also to be understood that the terminology used in the description is for the purpose of describing the particular versions or embodiments only, and is not intended to limit the scope of the present invention which will be limited only by the appended claims.

It must also be noted that as used herein and in the appended claims, the singular forms "a", "an", and "the" include plural reference unless the context clearly dictates otherwise. Thus, for example, reference to a "fluorinated ionomer" is a reference to one or more fluorinated ionomers and equivalents thereof known to those skilled in the art, and so forth. Unless defined otherwise, all technical and scientific terms used herein have the same meanings as commonly understood by one of ordinary skill in the art. Methods and materials similar or equivalent to those described herein can be used in the practice or testing of embodiments of the present invention. All publications mentioned herein are incorporated by reference. Nothing herein is to be construed as an admission that the invention is not entitled to antedate such disclosure by virtue of prior invention. "Optional" or "optionally" means that the subsequently described event or circumstance may or may not occur, and that the description includes instances where the event occurs and instances where it does not. All numeric values disclosed herein can be modified by the term "about" or "substantially" whether or not explicitly indicated. The term "about" or "substantially" generally refers to a range of numbers that one of skill in the art would consider equivalent to the recited value (i.e., having the same function or result). In some embodiments the term "about" or "substantially" refers to ±10% of the stated value, in other embodiments the term "about" or "substantially" refers to ±2% of the stated value. While compositions and methods are described in terms of "comprising" various components or steps (interpreted as meaning "including, but not limited to"), the compositions and methods can also "consist essentially of" or "consist of" the various components and steps, such terminology should be interpreted as defining essentially closed-member groups or closed-member groups.

During the coating of microporous membrane supports with solutions comprising a fluorinated ionomer or fluorinated ionomer precursor, a radical initiator, a crosslinker derived from a bis-olefin and a fluorocarbon solvent, it was discovered that crosslinked microporous membrane composites wettable with solutions containing methanol and water could be made, even on small pore sized supports, that are non-dewetting and that have a high water permeability. These microporous membrane composites could be made by distributing the ionomer and crosslinker on the microporous support. This was unexpected since crosslinked coatings have been reported to result in more coating material on the surfaces of the microporous membrane support which would be expected to decrease water permeability. The amount and equivalent weight of the one or more ionomers in the coating solution provided a microporous membrane composite with a high water permeability and flow loss of 82% or less in isopropyl alcohol compared to the microporous membrane support. It was further discovered that the solvent, ionomer or ionomer precursor concentration, and ionomer or ionomer precursor particle size were important in making wettable microporous membrane composites with high water permeability and flow loss of 82% or less in isopropyl alcohol compared to the microporous membrane support. The microporous membrane composites in versions of the invention are non-dewetting and have a flow loss or water permeability that makes them useful for filtration applications in a variety of manufacturing environments.

Versions of the invention comprise microporous membrane composites that are wettable with solutions containing methanol and water and that are non-dewetting. The microporous membrane composite has a crosslinked coating on the fluid contacting surfaces and pores of a microporous membrane support, the coating comprising an amorphous fluorinated ionomer comprising hydrophilic groups. In some versions the fluorinated ionomer has a major portion that is amorphous and a minor portion that is crystalline or partially crystalline. The ionomers in the coating on the microporous membrane support are crosslinked with hydrophobic groups. The microporous membrane composite is non-dewetting following autoclave treatment in water and has a surface energy of 27 dynes/cm$^2$ or more.

One version of the invention is a microporous membrane composite wettable with a solution containing methanol and water comprising a microporous membrane support that has a pore size of 0.45 microns or less, in some versions a rated pore size of 0.1 micron or less, and a coating comprising an amorphous crosslinked fluorinated ionomer coating surfaces including pores of the microporous membrane support. The crosslinked coating on the microporous membrane support gives a microporous membrane composite with a flow loss on average in isopropyl alcohol that is 82% or less compared to a flow loss on average in isopropyl alcohol for the uncoated microporous membrane support when measured using 500 milliliters of isopropyl alcohol at a pressure of 97,905 Pa. In some versions of the invention the microporous membrane supports are multilayered and comprise one or more retentive layers and one or more support layers. The crosslinked fluorinated ionomer can be formed from fluorinated monomeric units comprising tetrafluoroethylene; fluorinated monomeric units containing ethylenic unsaturation and functional precursor groups transformable into hydrophilic groups, the precursor groups chosen from the group consisting of —SO$_2$F, —COOR, —COF and combinations of these wherein R is a C$_1$ to C$_{20}$ alkyl radical or a C$_6$ to C$_{20}$ aryl radical.

The crosslinked fluorinated ionomer can be formed from crosslinking groups that are absent hydrophilic groups and in some versions of the invention the crosslinker is derived from, comprises, or consists of bis-olefins of formula (I):

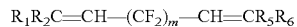

wherein: m=2-10, R$_1$, R$_2$, R$_5$, R$_6$, are equal to or different from each other or are H or C$_1$-C$_5$ alkyl groups.

The fluorinated ionomer can include iodine and or bromine groups deriving from a fluorocarbon chain transfer agent of formula:

where X$_1$ and X$_2$ are chosen from the group consisting of I, Br, and combinations of these.

In some versions of the invention, the fluorinated monomeric units containing ethylenic unsaturation and functional groups transformable into hydrophilic groups can comprise, consist of, or consist essentially of CF$_2$=CF—O—CF$_2$CF$_2$SO$_2$F units. The fluorinated crosslinked ionomer coating with hydrophilic groups that coats the microporous membrane surfaces and pores in versions of the invention provides microporous membrane composites that are wettable in solutions containing methanol and water, that have an ion exchange capacity of greater than 60 nanomoles/cm$^2$, in some versions greater than 95 nanomoles/cm$^2$. Advantageously the crosslinked fluorinated coatings in versions of the present invention are more stable in oxidative environments than traditional hydrophilization surface coatings such as polyvinyl alcohol coatings on microporous membranes.

Fluorinated compounds or fluorocarbon compound refer to chemical compounds, polymers, ionomers, chain transfer agents, crosslinking agents, solvents, and the like, having at least one carbon hydrogen bond or at least one carbon-bonded hydrogen replaced by a fluorine In some versions of the invention fluorinated compounds or fluorocarbon compound refer to chemical compounds, polymers, ionomers, chain transfer agents, crosslinking agents, solvents, and the like which do not have either all, or essentially all, of the carbon-bonded hydrogens replaced by fluorines. Perfluorinated compounds or perfluorocarbon compounds refer to chemical compounds, including polymers, ionomers, crosslinking groups, chain transfer agents and the like, where either all or essentially all carbon-bonded hydrogens have been replaced by fluorines. For example, perfluorinated can refer to a compound where all the hydrogen atoms, except those whose replacement would substantially affect the nature of the characteristic groups present, have been replaced by fluorine atoms. Some residual hydride may be present in a perfluorinated composition; e.g., less than 2 weight % of the perfluorinated product, in some cases less than 0.25 weight % of the perfluorinated product. For example, polyvinylidene fluoride is an example of a fluoropolymer, not a perfluorinated polymer, while PFA, MFA, FEP, polytetrafluoroethylene (PTFE), blends of these and the like are examples of perfluorinated polymers. Perfluorinated thermoplastic polymers useful for porous membrane may include but are not limited to perfluoroalkoxy (Teflon® PFA from Dupont, Neoflon® PFA from Daikin, Teflon® PFA Plus from Dupont), perfluoromethylalkoxy (Hyflon® MFA from Solvay Solexis), fluorinated ethylene propylene (Teflon®) FEP from Dupont) and co-polymers of these. These perfluorinated thermoplastics are chemically resistant and thermally stable, so that porous membranes made from of them can have a decided advantage over less chemically and thermally stable polymers. Other useful thermoplastic fluoropolymers that can be used may include homopolymers and copolymers comprising monomeric units derived from fluorinated monomers such as vinylidene fluoride (VF2), hexafluoropropene (HFP), chlorotrifluoroethylene (CTFE), vinyl fluoride (VF), trifluoroethylene (TrFE), and tetrafluoroethylene (TFE), among others, optionally in combination with one or more other non-fluorinated monomers.

Fluorosurfactant refers to a surfactant in which at least one hydrogen atom of the surfactant is replaced with a fluorine atom or the surfactant contains one or more fluorine atoms. In some versions of the invention the fluorosurfactant in isopropyl alcohol at 5,000 parts per million (ppm) by weight is 3M™ Novec™ FC 4432. Novec™ FC 4432 is a non-ionic polymeric fluorosurfactant available from 3M™.

The fluorinated coating in some versions of the invention, or the perfluorinated coating in other versions of the invention, on outer surfaces and pore surfaces of the microporous membrane support can be characterized by wetting a sample of the microporous membrane composite after the coating, curing and activation steps or acts, and then looking for opaque spots in the translucent coated microporous membrane during wetting tests with various solutions containing methanol and water. In one version of the invention, the coating may be characterized by looking for opaque spots in a methylene blue stained sample of the coated microporous membrane composite. Alternatively, differences in the densitometric readings of methylene blue dye stained microporous membrane composites can be used to characterize the uniformity of the crosslinked ionomer that coats liquid contacting surfaces of the microporous membrane support. In some embodiments the crosslinked ionomer coating is characterized by a relative standard deviation (standard deviation divided by mean) of the densitometric readings of a methylene blue stained coated microporous membrane composite that is less than 0.40. In other embodiments the crosslinked ionomer coating is characterized by a relative standard deviation of the densitometric readings of a methylene blue stained coated microporous membrane composite that is less than 0.30. In still other embodiments the crosslinked ionomer coating uniformity is characterized by a relative standard deviation of the densitometric readings of a methylene blue stained coated microporous membrane composite that is less than 0.06.

Microporous membrane composites in versions of the invention can be stained with methylene blue by immersing a cured, activated (transformable functional precursor groups like —SO$_2$F and/or —COF converted to —SO$_3$H and/or —COOH) microporous membrane composite test sample in isopropanol (IPA) to wet the microporous membrane composite. The wet microporous membrane composite test sample can then be immersed in a 0.1% aqueous solution of Methylene Blue dye until staining of the microporous membrane composite test sample surface is affected. The stained sample can then be washed sequentially in water, IPA and water while being agitated to remove excess dye from the membrane. The methylene blue stained microporous membrane composite can then be dried and evaluated by densitometry.

Versions of the invention include non-dewetting microporous membrane composites comprising a crosslinked amorphous ionomer coating on surfaces and pores of a microporous membrane support that are wet with solutions containing methanol and water. In versions of the invention the microporous membrane composite can have a surface energy of 27 dynes/cm or more (wets with about 80 wt % MeOH in water), or about 27 dynes/cm or more; in some versions of the invention the microporous membrane composite can have a surface energy of 40 dynes/cm or more (wet with about 30 wt % MeOH in water); in still some other versions the microporous membrane composite can have a surface energy of 50 dynes/cm or more (wets with about 15 wt % MeOH in water); in yet still other versions the microporous membrane composite can have a surface energy of between 40 dynes/cm and 50 dynes/cm. Advantageously, the microporous membrane composites in version of the invention with these surface energies can be wet instantly with many process chemicals allowing filters containing such microporous membrane composites to be packaged and shipped to end users in a dry state. Filters containing microporous membrane composites in a dry state can reduce manufacturing costs by eliminating the prewetting and autoclave steps for the manufacturer and can reduce shipping costs when compared to heavier, water containing pre-wet filters. End users benefit from filters containing microporous membrane composites in a dry state because they can eliminate downtime and costs associated and solvent exchange and the waste generated conditioning pre-wet filters.

In versions of the invention the microporous membrane composite is non-dewetting after autoclave treatment with water, and further has a coating structure where the water flow time of the microporous composite membrane is smaller after water autoclave than before water autoclave and the microporous membrane composite remains non-dewetting.

The coating comprising crosslinked ionomer on the liquid contacting surfaces of the microporous membrane support in versions of the invention can be characterized by spectroscopic techniques like FTIR or by optical methods like reflectance. For example, in one version of the invention, the coated microporous membrane support is stained with a dye indicative of hydrophilic groups in the coating and densitometric reflectance readings are taken at various points on the microporous membrane composite. The crosslinked ionomer coating on the microporous membrane support in versions of the microporous membrane composite can be further characterized by its properties following a chemical treatment. For example the treatment may include four or more hours flow through contact of a methylene blue stained microporous membrane composite with isopropyl alcohol containing 5000 parts per million by weight (ppm) 3M™ Novec™ FC 4432 fluorosurfactant at a temperature of between 70° C. and 80° C. at a flow rate of at least 80 ml/min through a 47 millimeter diameter sample of the microporous membrane composite. Densitometric readings or other spectroscopic characterizations on treated and untreated coated microporous membrane composite can then be compared. In some versions of the invention the coated microporous membrane composites have densitometric readings, or other characterization property such as FTIR transmission intensity of hydrophilic groups, that differ by less than ±9% of the mean after hot surfactant treatment compared to the mean of the characteristic property of the coated microporous membrane composite before such treatment. In some versions of the microporous membrane composites of the present invention, these means (characterization property before and after hot surfactant treatments) are not different at the 95% Confidence Limit (CL) by a Student-t test. In still some other versions of the invention, these means are not different at the 95% confidence limit by a Student-t test and densitometric readings, or other characterization property and differ by less than ±9% of the mean after hot surfactant treatment compared to the mean of the characteristic property of the coated microporous membrane composite before such treatment. Some versions of coated microporous membrane composites have densitometry readings, or other characterization property, that differ by less than ±4% of the mean after treatment compared to the mean of the characteristic property of the coated microporous membrane composite before treatment. In some versions these means are not different at the 95% confidence limit and the characterization property differs by less than ±4% of the mean after treatment compared to the mean of the characteristic property of the coated membrane before treatment.

Microporous membranes composites wettable with solutions containing mixtures of methanol and water and that are non-dewetting in versions of the present invention can have high water permeability. Calculated water permeability for microporous membrane composites in versions of the invention based on water flow time can be greater than 1000 l/atm*hr*m$^2$ at 22.5° C. measured on 47 millimeter diameter microporous membrane composite samples, especially after water autoclaving. In some versions of the present invention the calculated water permeability based on water flow time is greater than 1200 l/atm*hr*m$^2$ at 22.5° C. measured on 47 millimeter diameter microporous membrane composite samples. In still other versions of the present invention, the microporous membrane composite has a calculated water permeability based on water flow time that is greater than 1800 l/atm*hr*m$^2$ at 22.5° C. measured on 47 millimeter diameter microporous membrane composite samples. Without wishing to be bound by theory, the high water permeability and lower flow time achieved in versions of the microporous membrane composites of the present invention suggest that the microporous membrane surfaces in versions of the present invention have thinner crosslinked coatings compared to other coated membranes. Further the microporous membrane composites in versions of the present invention have a crosslinked ionomer coating characterized by a relative standard deviation of densitometric readings of 0.4 or less for methylene blue stained composites and the non-dewetting property of these composites based on an autoclave test in water.

Fluorinated ionomers, fluorinated monomers, chain transfer agents, radical initiators, and crosslinkers disclosed in U.S. Pat. No. 6,902,676 and U.S. Pat. No. 6,576,100, the contents of both of these incorporated herein by reference in their entirety, can be used for coating the porous membrane in versions of the present invention. In some versions of the present invention, one or more ionomer(s) of the same or different equivalent weight in the —SO$_2$F and/or —COF form and a solvent, in some versions the solvent comprise a fluorocarbon solvent, are used to form a coating solution comprising the ionomer(s). In some versions of the present invention the coating solution may include a solution and discrete particles of the ionomer(s), and in still other versions the coating solution may include discrete particles of the ionomer. These coating solutions are used to coat the microporous membrane support.

Coating solutions containing small ionomer particles, 200 nm or less, can be obtained by dissolving fluorinated ionomer or fluorinated ionomer precursor in a fluorocarbon solvent under stirring, followed by filtration or centrifuging. Centrifuging can be performed at high speed, for example at 10,000 rpm or more for about 2 hours. Eventual ionomer residue is thus separated and a transparent liquid composition including small ionomer particles is obtained. A fractionation effect regarding the equivalent weight of the copolymer in solution and the insoluble residue can occur, dependent on the fluorocarbon solvent used.

The resulting ionomer liquid solution delivers improved coating characteristics in the course of distributing the ionomer or ionomer precursor on the microporous membrane support surfaces. Such advantages comprise, among other, a reduced flow loss, the possibility to perform flow-through coating without occlusion of pores and coating of inner pore surfaces in addition to coating of membrane exterior surfaces, resulting in superior non-dewetting characteristics. Fluorocarbon liquid composition coating solutions obtained by applying this preparation method comprise crosslinkable fluorinated ionomers, wherein at least 90% by weight of the ionomer comprises, consists, or consists essentially of ionomer particles of a size lower than 200 nanometer (nm), in some versions of the invention ionomer particles of a size lower than 125 nm, in other versions of the invention ionomer particles of a size lower than 40 nm, and in still yet other versions of the invention ionomer particles of a size lower than 15 nm.

In some versions of the invention the fluorinated ionomer or fluorinated ionomer precursor exists as colloidal particles, or gel particles suspended, dispersed, or dissolved in the coating solution solvent. The colloidal particles or ionomer particles can have a size of about 200 nanometers or less, in some versions about 40 nanometers or less, and in still other versions about 15 nanometers or less. Small ionomer particles minimize plugging of the microporous membrane support pores and provide microporous membrane composites with lower flow loss. The fluorinated ionomer or fluorinated ionomer precursor particles in some versions of the invention can have a size between 10 nanometers and 40 nanometers, or a size between about 10 nanometers and about 40 nanometers. In other versions of the invention the fluorinated ionomer or fluorinated ionomer precursor particles in some versions of the invention can have a size between 10 nanometers and 600 nanometers, or a size between about 10 nanometers and about 600 nanometers.

In some versions of the invention the fluorinated monomer units can be partially reacted with monomeric units deriving from a bis-olefin, a radical initiator, and optionally chain transfer agent to form ionomers or ionomer precursors. These ionomers or ionomer precursors can be further reacted with additional bis-olefin and radical initiator to form the crosslinked ionomer coating on the microporous membrane support. Use of the term "ionomer" in the claims and specification includes fluorinated ionomer as well as fluorinated ionomer precursors.

In versions of the invention a coating solution, which in some versions of the invention can be a fluorocarbon liquid composition, is distributed onto the liquid contacting surfaces of the microporous membrane support. The coating solution or fluorocarbon liquid composition in some versions of the invention can comprise a fluorocarbon solvent, fluorinated ionomer or ionomer precursor particles, a radical initiator, bis-olefin crosslinking agent, and optionally a chain transfer agent. The fluorinated ionomer comprises fluorinated monomer units containing ethylenic groups and functional groups transformable into hydrophilic groups and the fluorinated ionomer is dissolved or dispersed in the fluorocarbon solvent such that in some versions of the invention at least 90% by weight of the fluorinated ionomer consisting of particles of size lower than 200 nanometers (nm), in some versions lower than 125 nm, in other versions lower than 40 nm, in still yet other version lower than 15 nm. The fluorinated ionomer has an equivalent weight of between 380 g/eq and 620 g/eq. Once the coating solution or fluorocarbon liquid composition has been distributed on to the membrane support liquid contacting surfaces it can be cured and subsequently activated to transform the functional groups into hydrophilic groups.

Solvents, also referred to herein as a liquid fluorocarbon medium, for the coating solutions, centrifugation, and fluorocarbon liquid compositions can include those that solvate or disperse the fluorinated ionomer particles, crosslinker, radical initiator, and optionally a chain transfer agent, and that also wets the microporous membrane support. The solvent or liquid fluorocarbon medium can comprise a fluorocarbon solvent and optionally one or more other solvents that solvate or disperse the ionomer, crosslinker and radical initiator and wets the microporous membrane. Examples of solvents or liquid fluorocarbon medium can include but are not limited to Novec™ HFE-7100 (methoxy nonafluorobutane, surface tension 13 dynes/cm available from 3M™), Galden® SV90 (perfluoropolyether, surface tension 16 dynes/cm available from Solvay Solexis), and other similar fluorinated low surface tension solvents, combinations of these, or mixtures containing these solvents. In some versions of the invention the invention the fluorocarbon liquid medium comprises the methoxy nonafluorobutane isomers $(CF_3)_2CFCF_2$—O—$CH_3$ and/or $CF_3CF_2CF_2CF_2$—O—$CH_3$, in some cases at a cumulative purity superior to 99% w/w.

In some versions of the invention the fluorocarbon liquid medium comprises a perfluoropolyether or consists of a mixture of perfluoropolyethers. In versions of the invention the perfluoropolyethers can have the general formula $F_3C$—O—$[CF_2$—$CF(CF_3)$—$O]_n[CF_2$—$O]_m$—$CF_3$ wherein m and n are integers, being n>0 and m≥0, the perfluoropolyethers each having molecular weight between 300 and 600 amu and a boiling point between 20° C. and 150° C. In other versions of the invention the fluorinated liquid medium contains mixtures of perfluoropolyethers having the above formula, the mixtures having prevailing ("average") boiling points comprised between 55° C. and 135° C. and an average ratio between the indexes m and n (m/n) below 0.05. One version of the liquid fluorocarbon medium composition contains a mixture of perfluoropolyethers having the above formula, each perfluoropolyether has a molecular weight between 400 and 600 amu, the mixture having a prevailing ("average") boiling point comprised between 80° C. and 100° C. and an average ratio between the indexes m and n (m/n) below 0.05.

In some versions of the invention the fluorocarbon liquid medium comprises a hydrogenated fluoropolyether or consists of a mixture of hydrogenated fluoropolyethers. In versions of the invention the hydrogenated fluoropolyethers (HFPE) can have the general formula $R^*$—O—$R_f'$—$R^{*'}$ wherein: —$R^*$ and $R^{*'}$, equal or different from each other, are independently chosen between —$C_mF_{2m+1}$ and —$C_nF_{2n+1-h}H_h$ groups, with m, n being integers from 1 to 3, h being integer ≥1, chosen so that h≤2n+1, with the proviso that at least one of $R^*$ and $R^{*'}$ is a —$C_nF_{2n+1-h}H_h$ group, as defined above;

—$R_f'$ is chosen among the following:

(1) —$(CF_2O)_a$—$(CF_2CF_2O)_b$—$(CF_2$—$(CF_2)_{z'}$—$CF_2O)_c$—, with a, b and c being integers up to 10, preferably up to 50, and z' being an integer equal to 1 or 2, a≥0, b≥0, c≥0 and a+b>0; preferably, each of a and b being >0 and b/a being comprised between 0.1 and 10;

(2) —$(C_3F_6O)_{c'}$—$(C_2F_4O)_b$—$(CFXO)_t$, with X being, at each occurrence, independently selected among —F and —$CF_3$; b, c' and t being integers up to 10, c'>0, b≥0, t≥0; preferably, b and t>0, c'/b being comprised between 0.2 and 5.0 and (c'+b)/t being comprised between 5 and 50;

(3) —$(C_3F_6O)_{c'}$—$(CFXO)_t$—, with X being, at each occurrence, independently selected among —F and —$CF_3$; c' and t being integers up to 10, c'>0, t≥0, preferably t>0, c'/t being comprised between 5 and 50. $R_f'$ is preferably selected among structures (1) and (2), as above detailed.

The concentration of ionomer or ionomer precursor in the fluorocarbon liquid composition as a coating solution that is applied to the microporous membrane support is sufficient to provide an activated crosslinked coating on surfaces and pores of the microporous membrane support such that the liquid contacting surfaces of the microporous membrane composite are non-dewetting by an autoclave test and the microporous membrane composites can be completely wet with solutions containing methanol and water. The concentration of ionomer in the solution provides a microporous membrane composite that has a relative standard deviation of densitometric measurements that are 0.4 or less. The ionomer concentration used in the fluorocarbon liquid composition solution for coating the inert microporous membrane support in some versions of the invention can be in a range of from 0.1 weight percent ionomer(s) to 4 weight percent ionomer(s), or about 0.1 weight percent to about 4 weight percent. In other versions of the invention the ionomer concentration used in the fluorocarbon liquid composition solution for coating the inert microporous membrane support in some versions of the invention can be in a range of from 0.1 weight percent ionomer(s) to 3.5 weight percent ionomer(s), or about 0.1 weight percent to about 3.5 weight percent. Ionomer concentrations below 0.25%, for example 0.1%, may be used and the coating evaluated by wettability and densitometric measurements; ionomer concentrations too low will result in incompletely coated microporous membrane supports that will have hydrophobic spots and not be completely wet with solutions containing methanol and water and optionally will have densitometric readings with a relative standard deviation of greater than 0.4. Ionomer concentrations greater than about 3.5 wt % or greater than about 4 wt % can result in microporous membrane composites that have a flow loss greater than 82% as measured with isopropyl alcohol and calculated based on the flow time of the uncoated microporous membrane support.

In versions of the present invention, the microporous membrane composite has a thin coating comprising a crosslinked fluorinated ionomer. In some versions of the invention, the coating weight percentage can be 2 weight percent to 50 weight percent of the total mass of the high surface area microporous membrane composite. In other versions of the invention the coating weight percentage can be from 2 weight percent to 30 weight percent of the total mass of the high surface area microporous membrane composite. In still some versions of the invention, the coating weight percentage is 25 weight percent to 30 weight percent, or about 25 weight percent to about 30 weight percent, of the total mass of the high surface area microporous membrane composite. In still other versions of the invention the coating weight percent can be 2 weight percent to 25 weight percent, or about 2 weight percent to about 25 weight percent, of the total mass of the high surface area microporous membrane composite. Coating weight percentages (percent of support and coating) are not limited to those disclosed and can vary depending upon the surface area of the microporous membrane support. The coating weight percentage are chosen to provide a non-dewetting microporous membrane composite characterized by a flow loss (based on flow time for 500 milliliters isopropyl alcohol at about 14.2 psi (about 97905 Pa) pressure) that on average is 82% or less, or about 82% or less, based on the flow time of the uncoated microporous membrane support.

In some versions of the invention the thickness of the crosslinked ionomer coating on the microporous membrane support is characterized by a flow loss (based on flow time for 500 milliliters isopropyl alcohol through the microporous membrane composite at about 14.2 psi (about 97905.5 Pa) pressure) that on average is 82% or less based on the flow time of the uncoated microporous membrane support. In other versions of the invention the thickness of crosslinked ionomer coating on the microporous membrane support is characterized by a flow loss (based on flow time for 500 milliliters isopropyl alcohol through the microporous membrane composite at about 14.2 psi (about 97905.5 Pa) pressure) that on average is 46% or less based on the flow time of the uncoated microporous membrane support. In still some other versions of the invention the thickness of the thin crosslinked coating on the microporous membrane support is characterized by a flow loss (based on flow time for 500 milliliters isopropyl alcohol through the microporous membrane composite at about 14.2 psi (about 97905.5 Pa) pressure) that on average is 30% or less based on the flow time of the uncoated microporous membrane support. In yet still other versions of the invention the thickness of the thin crosslinked coating on the microporous membrane supports is characterized by a flow loss range (based on flow time for 500 milliliters isopropyl alcohol through the microporous membrane composite at about 14.2 psi (about 97905.5 Pa) pressure) that on average is between 24% to 82% based on the flow time of the uncoated microporous membrane supports.

The fluorinated ionomers or perfluorinated ionomers used in the coating in versions of the invention can be amorphous or can be a mixture comprising amorphous ionomers and a portion of crystalline ionomers as disclosed in U.S. Pat. No. 6,902,676 incorporated herein by reference in its entirety. Ionomers and ionomer precursors in versions of the invention can have equivalent weights of from about 380 g/eq to about 620 g/eq, in some versions from about 400 g/eq to about 620 g/eq, in still some other versions the ionomers can have equivalent weights of from about 460 g/eq to about 600 g/eq, or equivalent weights between 460 g/eq to 600 g/eq. The ionomer can include a distribution of equivalent weights, in some cases around an average equivalent weight, and for purposes of the claims and description may still be referred to as an ionomer of a particular designated equivalent weight. For example, and without limitation, an ionomer designated as having an equivalent weight of 460 g/eq can include ionomers spanning from 400 g/eq to 520 g/eq, with the average equivalent weight being about 460 g/eq. As shown by the examples herein, the wettability of microporous membrane composites decreases with decreasing equivalent weight of the ionomer in the coating solution while flow loss increases with increasing equivalent weight of the ionomer (see for example 2 wt % ionomer for 458 g/eq (44% flow loss), 2 wt % ionomer for 512 g/eq (68% flow loss), 2 wt % ionomer for 597 g/eq (77% flow loss) in Examples 6, 5, and 4 respectively). Accordingly in some versions of the invention the combination of low flow loss and good wettability in a microporous membrane composite is achieved with ionomers having an equivalent weight in the range of about 400 g/eq to about 620 g/eq, in some versions of the invention about 460 g/eq to about 600 g/eq. The weight percent ionomer in the coating solution can range from about 0.1 percent to about 3.5 percent.

Mixtures of one or more ionomers or ionomer precursors with different equivalent weights or mixtures of one or more ionomer compositions, each having a distribution of equivalent weights around an average equivalent weight, may also be used for coating the microporous membrane support. The ionomers or ionomer presursors can be fluorinated. A mixture or combination of low equivalent weight ionomer(s) and high equivalent ionomer(s) can refer to but is not limited to for example a mixture of ionomer having an equivalent weight centered about 460 g/eq and an ionomer having an equivalent weight centered about 600 g/eq. One or more ionomers can be used with one or more crosslinkers, one or more chain transfer agents, and one or more radical initiators to form the thin crosslinked coating on the microporous membrane support liquid contacting and filtration surfaces. The equivalent weight of the one or more ionomer(s) used in the coating can be chosen in amounts to provide a coating on unmasked surfaces and pores of the inert microporous membrane support while also providing a non-dewetting microporous membrane composite that is wettable with a methanol containing aqueous solution. Optionally the ionomer composition can be filtered or centrifuged to remove ionomer particles and/or ionomer gel particles that may be present and that could block or blind pores in the inert microporous membrane support.

The ionomers are fluorinated polymers in versions of the invention and may comprise, or consist of —SO$_3$H and/or —COOH functional groups. In some versions of the invention the fluorinated polymers comprise or consist of —SO$_3$H groups. In some versions these ionomers have an equivalent weight that result in an amorphous polymer, in some versions the fluorinated ionomers utilized for modifying the porous membrane surfaces may comprise a mixture of both amorphous and crystalline ionomers as disclosed in U.S. Pat. No. 6,902,676. The ionomers may consist of or be comprise of: (A) monomeric units deriving from or comprising one or more fluorinated monomers containing at least an ethylenic unsaturation group; (B) fluorinated monomeric units containing functional groups transformable into hydrophilic groups, —SO$_2$F and/or —COOR, —COF, wherein R is a C—C$_{20}$ alkyl radical or a C$_6$-C$_{20}$ aryl radical, in such an amount to give an equivalent weight that results in an amorphous ionomer, the functional groups being converted into hydrophilic groups, preferably into —SO$_3$H and/or —COOH groups in the final membrane when the functional groups were —SO$_2$F and/or —COOR, —COF. Ionomers used in versions of the invention are not of the formula: [T-SO$_2$Y—SO$_2$T']$^-$M$^+$ as disclosed in U.S. Pat. No. 7,094,469.

The fluorinated monomers of type (A) may be selected from: vinylidene fluoride (VDF); C$_2$-C$_8$ perfluoroolefins, preferably tetrafluoroethylene (TFE); C$_2$-C$_8$ chloro- and/or bromo- and/or iodo-fluoroolefins, such as chlorotrifluoroethylene (CTFE) and bromotrifluoroethylene; CF$_2$=CFOR$_f$ (per)fluoroalkylvinylethers (PAVE), wherein R$_f$ is a C$_1$-C$_6$ (per)fluoroalkyl, for example trifluoromethyl, bromodifluoromethyl, pentafluoropropyl; CF$_2$=CFOX perfluoro-oxyalkylvinylethers, wherein X is a C$_1$-C$_{12}$ perfluoro-oxyalkyl having one or more ether groups, for example perfluoro-2-propoxy-propyl.

Crosslinking can take place both by an ionic and a radical route. A mixed crosslinking can also be used. In some versions the crosslinking takes place by peroxy route, and accordingly the ionomers contain radical attack sites in the chain and/or in end position of the macromolecules, for examples iodine and/or bromine atoms. The radical crosslinking can take place also on the carbon atoms of a bis-olefin when the ionomer contains this unit. In some versions of the invention crosslinking of the ionic type takes place. For example for sulphonic ionomer crosslinking, a crosslinking agent can be added which allows the reaction between two —SO$_2$F groups. See patent application WO 99/38,897 incorporated herein by reference in its entirety. In other versions of the invention crosslinking is not by the ionic type and crosslinking between two —SO$_2$F or two —SO$_3$H group does not occur. In versions of the present invention, the crosslinking provides a non-dewetting coating where the ionomer amount that coats the microporous membrane support walls or surfaces and pores has a flow loss in an isopropyl alcohol of 82% or less as described herein. Crosslinkers in the coatings and fluorocarbon liquid composition in versions of the invention are hydrophobic and do not contain or are absent hydrophilic groups or are absent crosslinking groups having sulfonyl or carbonyl-containing groups such as those disclosed in U.S. Pat. No. 7,112,363. In some versions of the invention the crosslinkers can comprise or consist of bis-olefins chosen from structures of formula (OF-1), (OF-2), (OF-3), or combinations of these.

In some versions of the invention, the fluorinated ionomers of the invention comprise: monomeric units deriving from TFE; monomeric units deriving from CF$_2$=CF—O—CF$_2$CF$_2$ SO$_2$ F; monomeric units in an amount of 0.01% to 5% by moles deriving from the bis-olefin of formula (I):

$$R_1R_2C=CH-(CF_2)_m-CH=CR_5R_6 \qquad (I)$$

wherein: m=2-10, in some versions m=4-8; R$_1$, R$_2$, R$_5$, R$_6$, are equal to or different from each other or are H or C$_1$-C$_5$ alkyl groups. In some versions of the invention the ionomer contains iodine and or bromine atoms in a terminal position from a fluorocarbon chain transfer agent, for example of formula R$_f$(I)$_x$(Br)$_y$, where R$_f$ is a fluoroalkyl or (per)fluoroalkyl or a (per)fluorochloroalkyl group having from 1 to 8 carbon atoms, while x and y are integers comprised between 0 and 2, with 1≤x+y≤2 (see for example U.S. Pat. Nos. 4,243,770 and 4,943,622). It is also possible to use as chain transfer agents iodides and/or bromides of alkaline or alkaline-earth metals, according to U.S. Pat. No. 5,173,553.

In some versions of the invention the crosslinking of radical type uses ionomers containing units of the bis-olefin of formula (I) and iodine in the end or terminal position of the macromolecule chains.

As regards the introduction in the chain of such iodine and/or bromine atoms, it can be carried out by addition, in the reaction mixture, of brominated and/or iodinated "cure-site" comonomers, such as bromo and/or iodo olefins having from 2 to 10 carbon atoms (as described for example in U.S. Pat. No. 4,035,565 and U.S. Pat. No. 4,694,045), or iodo and/or bromo fluoroalkylvinylethers (as described in U.S. Pat. No. 4,745,165, U.S. Pat. No. 4,564,662 and EP 199, 138), in such amounts whereby the content of "cure-site" comonomers in the final product is generally in the range of 0.05 moles per 100 moles of the other basic monomeric units to 2 moles per 100 moles of the other basic monomeric units.

The introduction as comonomer of the bis-olefin of formula (I), having a number of unsaturations higher than the unit, is advantageous since the comonomer has the function to pre-crosslink the ionomer during the polymerization. The bis-olefin of formula (I) introduction has the advantage to increase the length of the primary chains forming the final coating.

When the ionomer of the invention is crosslinked by a radical route, a crosslinking or curing temperature in the range 100° C. to 300° C. can be used to cure the monomers, depending on the microporous membrane support and the type the peroxide initiator used. Curing results in the thin coating becoming bound to the microporous membrane support. Generally, the peroxide initiator can be in an amount in the range 0.1% to 5% by weight with respect to the ionomer. Suitable radical initiators can include but are not limited to dialkylperoxides, such as for example di-terbutyl-peroxide and 2,5-dimethyl-2,5-di(terbutylperoxy) hexane; dicumyl peroxide; dibenzoyl peroxide; diterbutyl perbenzoate; di-1,3-dimethyl-3-(terbutylperoxy)butylcarbonate. Other peroxidic systems are described, for example, in patents EP 136,596 and EP 410,351. The amount of bis-olefin typically added to the solution is from about 0.1% weight to about 5% weight or in some versions about 0.1 wt % to 3% weight percent.

Following distribution of the coating solution on the various surfaces of the microporous membrane support, for example but not limited to exterior surfaces, interior surfaces, filtration surfaces, fluid contacting surfaces, pore surfaces and the like, excess coating solution having for example fluorinated ionomer, radical initiator, fluorocarbon solvent, and crosslinking agent can be removed from the inert microporous membrane support. The solvent can be removed from this coated microporous membrane support. Crosslinking can be performed in some versions of the invention at a temperature of from about 140° C. to about 180° C. in a closed container for about 10 minutes to 60 minutes or about 60 minutes. One version of the invention is a microporous membrane support with a coating of crosslinked ionomer on the liquid contacting surfaces and pores of the microporous membrane support.

The conversion or activation of the transformable precursor groups of the fluorinated ionomer into hydrophilic groups, for example sulphonyl groups —$SO_2$ F into acid sulphonic groups $SO_3H$, can be carried out by known methods. For example, activation can take place by treating the intermediate microporous membrane coated with the cured and crosslinked ionomer for about 4 hours to about 8 hours at a temperature of from about 65° C. to about 85° C. in an aqueous strong base like KOH solution at about for example but not limited to 10% by weight concentration, washing this base treated cured coated microporous membrane in demineralized water, treating the base treated cured coated microporous membrane for about 2 hours to about 16 h at room temperature in a strong aqueous acid like HCl or nitric acid at for example but not limited to 20% by weight, and lastly washing this activated and cured microporous membrane composite with demineralized or deionized water. Similar transformation of —COF and or —COOR groups could be carried out. Microporous membrane supports that have been coated with ionomer or ionomer precursor(s) as disclosed herein that have been cured and activated are referred to as microporous membrane composites in versions of the invention.

One version of the invention includes an intermediate composition comprising a high surface area or multilayer microporous membrane support with filtration surfaces coated with a cured fluorinated crosslinked ionomer coating with groups transformable into hydrophilic groups.

Following curing and subsequent activation by treatment with strong base and strong acid, the microporous membrane composite can be further extracted with a solvent like hot water at a temperature such that the microporous membrane support remains integral. It was discovered that for some multilayer microporous membrane supports used in versions of the invention, that extraction with boiling water resulted in delamination of the microporous membrane composite. By using temperatures below the boiling point of the extraction solvent, the integrity of multilayer microporous membrane composites could be retained and low extractables could be achieved. For example, the crosslinked fluorinated ionomer coating on the microporous membrane support could be washed by treatment in hot water at a temperature ranging from about 80° C. to about 90° C. for about 30 minutes or for a sufficient time to remove undesired residual contaminants including anions and cations from the membrane without delaminating the underlying microporous membrane support. Versions of the invention include non-boiling solvent extracted, in some cases non-boiling water extracted, multilayer microporous membrane composites that are integral, non-dewetting multilayer microporous membrane composites that are wet with methanol containing aqueous solutions.

Porous membranes with a hydrophilic coating, as described in the cited references, are directly wettable with water on their exterior surfaces, but these coated porous membranes may not be non-dewetting following an autoclave treatment in water at 135° C. if the coating does not wet and adhere to all microporous membrane surfaces, such as inner pore surfaces as well as membrane exterior or geometric surfaces.

In versions of the present invention, the microporous membrane support has its surfaces and pores, the liquid contacting surfaces of the microporous membrane support, coated by crosslinked fluorinated ionomer coating composition or a crosslinked perfluorinated ionomer coating composition so that no unmasked exposed microporous membrane surface is present that could dewet following an autoclave treatment at 135° C. with water. The coating composition can be applied by methods that coat the fluid contacting surfaces, exterior surfaces and pore surfaces, of the microporous membrane support. In some versions of the invention, infiltration is used to coat the microporous membrane support filtration or liquid contacting surfaces. In other versions of the invention the coating is distributed onto the microporous membrane support surfaces and pore surfaces. Distribution of the coating can be by mechanical methods such as but not limited to roller coating, web coating using one or more squeeze bars and the like, pressure intrusion, and other related techniques such as gravity flow and pressure, where the coating material contacts and wets the microporous membrane pores and liquid contacting surfaces to coat the microporous membrane support with a solution comprising fluorinated ionomer. Distribution of the composition comprising fluorinated ionomer in a fluorocarbon solvent containing solution wets the unmasked microporous membrane surfaces with a coating of ionomer and crosslinker. Distribution of the coating solution onto and within the microporous membrane support also allows the preparation of non-dewetting microporous membrane composites with a flow loss structure that can be varied proportionally with the percent ionomer in the coating solution. Distributing the coating on the microporous membrane support overcomes the problem of uniformly depositing thin crosslinked fluorinated ionomer coatings, the thickness of the coating being proportional to the percent flow loss, on high surface area microporous membrane supports.

In some versions of the invention, the microporous membrane support can be patterned by masking so that an unmasked portion of the microporous membrane support surfaces and pores are coated with ionomer and crosslinker and while the other masked portion of the microporous membrane surface and pores are not coated with ionomer and crosslinker. In some versions of the invention the edge portion of the microporous membrane is not coated thereby forming an edge hydrophobic membrane region while a center portion of the microporous membrane is coated with fluorinated ionomer and cross linker as described herein to form a microporous membrane composite region wettable with solutions containing methanol and water. Such a patterned microporous membrane composite would be useful, for example as a filtration membrane having gas venting capacity wherein gas could pass through the uncoated portion of the microporous membrane composite but not through the coated portion of the microporous membrane composite. Aqueous liquid could pass through the coated portion of the microporous membrane composite but not through the uncoated portion of the microporous membrane composite.

The microporous membrane composites in versions of the invention have a crosslinked coating of fluorinated ionomer with hydrophilic groups on the microporous membrane support liquid contacting surfaces and filtration surfaces (i.e., the pore surfaces and external geometric surface). The coating of crosslinked ionomer on the liquid contacting surfaces of the bulk matrix material making up the microporous membrane composite make the coated surfaces non-dewetting (after autoclave at 135° C. in water) and wettable with water and methanol mixtures. The ionomer coating on the surface of the microporous membrane support can be bound by crosslinking, by mechanical bonds, physical bonds, chemical bonds, or any combination of these by curing.

The crosslinked ionomer coating on the microporous membrane support prevents microporous membrane composite dewetting when filtering an outgassing liquid. The crosslinked ionomer coating promotes uniform filtration and uniform non-dewetting properties throughout a filter device that comprises a microporous membrane composite in verions of the invention. The coating of crosslinked ionomer on the microporous membrane support in versions of the invention can be measured or characterized by methylene blue dye staining and relative standard deviation of densitometric readings of 0.4 or less and non-dewetting behavior following water autoclave of the microporous membrane composites. The ionomer and crosslinker comprising composition in versions of the invention is utilized in amounts and concentrations so that the microporous membrane support is not substantially blocked or plugged as determined by measuring percent flow loss or flow time across the microporous membrane composite during flow through of purified water or isopropyl alcohol. The microporous membrane composite of this invention has a flow loss on average from several microporous membrane composite samples of 82% or less based on the flow time on average of the uncoated microporous support and the flow time on average of the microporous membrane composite. In other versions of the invention the flow loss on average from several microporous membrane composite samples is 60% or less based on the flow time on average of the uncoated microporous support and the flow time on average of the microporous membrane composite. In still other versions of the invention the flow loss on average from several microporous membrane composite samples is 50% or less based on the flow time on average of the uncoated microporous support and the flow time on average of the microporous membrane composite. In yet still other versions of the invention the flow loss on average from several microporous membrane composite samples is 40% or less based on the flow time on average of the uncoated microporous support and the flow time on average of the microporous membrane composite. A lower percent flow loss for the microporous membrane composite allows less membrane to be used and smaller filtration devices to be made reducing costs and the space used to house such a filter.

In addition to using the flow loss property to characterize coating bound to the microporous membrane support, the coating modifying the microporous membrane composite can be characterized by optical methods. The relative standard deviation of the optical readings made of the microporous membrane composite can be related to coating uniformity. In some versions of the invention the coating uniformity has a measured relative standard deviation of optical readings that is 0.4 or less. For example, in versions of the invention, the crosslinked ionomer coating on the microporous membrane support is characterized by a mean of the densitometry readings of the coated microporous membrane composite stained with methylene blue that has a relative standard deviation of 0.4 or less; in some versions of the invention the crosslinked ionomer coating on the microporous membrane support is characterized by a mean of the densitometry readings of the coated microporous membrane composite stained with methylene blue that has a relative standard deviation of 0.3 or less, and in still other versions of the invention the crosslinked ionomer coating on the microporous membrane support is characterized by a mean of the densitometry readings of the coated microporous membrane composite stained with methylene blue that has a relative standard deviation of 0.06 or less. A smaller relative standard deviation of the densitometer readings indicates more uniform coating of the microporous membrane composite which can lead to greater utilization of the microporous membrane composite area during filtration of outgassing fluids.

The microporous membrane support can be formed of polymer or thermoplastic that is chemically inert to the curing and activation steps of the coating process. In some versions of the invention the microporous membrane support polymer is a polyfluorocarbon or polyperfluorocarbon that is chemically inert to the curing and activation steps of the coating process. Examples of microporous membrane supports that can withstand the curing and activation steps can comprise fluorine-containing polymers and may include but are not limited to polytetrafluoroethylene (PTFE), fluorinated ethylene-propylene (FEP) copolymer, a copolymer of tetrafluoroethylene and perfluoropropyl vinyl ether (PFA, also referred to as a perfluoroalkoxy polymer), a copolymer of tetrafluoroethylene and perfluoromethyl vinyl ether (MFA), and polymer compositions comprising any of these. The microporous membrane support can for example be formed from polytetrafluoroethylene, fluorinated ethylene-propylene copolymer or a perfluoroalkoxy polymer may include the group of fluoropolymers generally known as fluorocarbons marketed by E. I. Dupont de Nemours and Company, Inc. under the names Teflon® PTFE, Teflon® FEP and Teflon® PFA or amorphous forms of Teflon® polymers such as Teflon® AF polymer. Other fluorocarbons for the microporous membrane support may include but are not limited to those available from Daikin such as Neoflon®-PFA and Neoflon® FEP, or various grades of Hyflon®-PFA and Hyflon®-MFA available from Solvay Solexis. Fluoropolymers have excellent chemical and heat resistance and in general are hydrophobic. Expanded porous polytetrafluoroethylene (ePTFE) polymers have good strength properties. Thus, various forms of expanded porous polytetrafluoroethylene can be used as a microporous membrane support in versions of the invention because it is useful as a filter media for organic solvents and for use in harsh chemical environments.

For purposes of the description and claims the term microporous membrane support will be used to include porous membranes that may also be described by terms such as ultraporous membrane, nanoporous membrane, and microporous membrane. These microporous membranes retain feed stream components (retentate) such as but not limited to gels, particles, colloids, cells, poly-oligomers, and the like that are larger than the pores of the microporous membrane while components smaller than the pores pass through the pores into a permeate steam. Retention of components in the feed stream by the microporous membrane can be dependent upon operating conditions, for example face velocity and use of surfactants, and dependent upon the size and structure of the particle relative to the size, structure and distribution of the membrane pores.

Porous media are useful in many separation and adsorption technologies, such as filtration. One particular type of porous media, microporous membranes, are used for a variety of applications. Microporous membranes can be described as having a first porous surface, a second porous surface, and a continuous porous structure that extends throughout the membrane from the first porous surface to the second porous surface. The continuous porous structure includes the bulk material matrix and the network of pores. The interface separating the bulk matrix from the pore volume (i.e., the surface of the interior pore network) can be referred to as the interstitial surface.

Microporous membranes useful as a porous support in versions of the present invention can include those that can be coated to form microporous composite membranes with a flow loss in isopropyl alcohol of 82% or less compared to the uncoated microporous membrane support. In some versions of the invention the microporous membrane support can have a pore size that can be 10 microns or less, in other versions the pore size of the microporous membrane support can be 0.45 microns or less, in some other versions of the invention the pore size of the microporous membrane support can be 0.2 microns or less, and in still some other versions of the invention the pore size of the microporous membrane support can be 0.1 microns or less. In other versions of the invention the pore size of the microporous membrane support can range from about 0.001 microns to 0.45 microns, in yet still other versions the rated pore size for the microporous membrane support can range from about 0.005 micron to about 0.1 micron. In some versions the microporous membrane support can be characterized by a molecular weight cutoff (MWCO) and may include those membranes having a MWCO of from about 2 kDa (1 kDa=1000 g/mole) to about 20,000 kDa. Microporous membranes with smaller pore sizes allow the retention of smaller particles by sieving retention in a liquid compared to larger pore size microporous membranes. Microporous membrane supports can have a total thickness, the microporous membrane includes one or more retentive layers and optionally one or more support layers, such that the total thickness can range from about 4 microns to about 75 microns, in some versions the total thickness can range from about 14 to about 25 microns. Thinner microporous membrane supports have lower pressure drop than thicker microporous membranes. In some versions of the invention the microporous membrane support has a multilayer structure that includes one or more retentive layers and one or more support layers. In some versions of the invention the multilayer microporous membrane support is a 0.1 micron pore size microporous PTFE membrane; in some versions the multilayer microporous membrane is a 0.05 micron pore size microporous PTFE membrane; in some versions of the invention the multilayer microporous membrane is a 0.03 micron pore size microporous PTFE membrane; in some versions of the invention the multilayer membrane is a 0.02 micron pore size microporous PTFE membrane. Multilayer PTFE composite membranes are available from Gore and are described in U.S. Pat. No. 7,306,729 and U.S. Patent Publication No. 2007/0012624 the contents of these documents incorporated herein by reference in their entirety into the present disclosure. Smaller rated pore size membranes have better sieving only retention for small particles and are advantageous for use in chemical, semiconductor, pharmaceutical, and other industrial manufacturing environments where particles, gels, colloids and the like can reduce process purity and process yield.

Rated pore size, nominal pore size, or pore size of the microporous supports coated in versions of the invention can refer to microporous membranes characterized by the method disclosed in U.S. Pat. No. 7,306,729 the contents of which are incorporated herein by reference in their entirety.

In some cases the rated pore size, nominal pore size, or pore size of the microporous supports means at least 90 percent or more retention of particles at the membrane pore size or MWCO, or at least 90 percent or more retention of particles larger that the membrane pore size or MWCO. In some versions the rated pore size, nominal pore size, or pore size of the microporous supports means at least 99 percent or more retention of particles at the membrane pore size, or MWCO, or at least 99 percent or more retention of particles larger that the membrane pore size or MWCO. Retention can be determined by optical methods or TEM analysis of retentate and permeate particles after evaporation of solvent.

The porous membrane substrate or microporous membrane support is chemically inert and is formed of a polymeric composition which is not solvated or degraded by the solvent for the fluorocarbon polymer composition or degraded by conditions and reagents used to cure and activate the amorphous fluorinated coating on the microporous membrane support. The microporous membrane support can have any convenient geometric configuration including a flat sheet, a corrugated or pleated sheet, a hollow fiber or the like. The microporous membrane support can be supported or unsupported by webs, nets, cages and the like. The microporous membrane support can be isotropic or anisotropic, skinned or unskinned, symmetric or asymmetric, any combination of these or can be a composite membrane including one or more retentive layers and one or more support layers. In some versions of the invention the microporous membrane support has a high surface area due to the small pore size rating of one or more retentive layers and optionally one or more porous support layers. In some versions of the invention, the high surface area membrane has a retentive layer pore size of less than 0.45 microns and one or more support layers. In versions of the invention, the microporous membrane support can have an overall asymmetric structure due to porous support layers on either side of one or more microporous retentive layers.

In some versions of the invention, the microporous membrane supports as well as the microporous membrane composites have surface area per mass values of 10 m$^2$/gram or greater, in some versions of the invention the microporous membrane support has a surface area per mass values of 20 m$^2$/gram or greater. The surface area of porous membranes supports and microporous membrane composites can be determined by the BET method as disclosed in U.S. Pat. No. 7,306,729 incorporated herein by reference in its entirety. Higher surface area microporous membrane supports can provide higher surface area microporous membrane composites with higher ion exchange capacities which can be advantageous for purification applications of the microporous membrane composites as well as improved wettability.

The non-dewetting properties of the microporous membrane support with a coating of crosslinked ionomer in versions of the present invention can be determined by heating a microporous membrane composite sample wet with a liquid in an autoclave above the boiling point of the liquid. If a microporous membrane composite sample is non-dewetting, the sample will remain wet and translucent following the autoclave treatment. For example, non-dewetting microporous membrane composites in versions of the invention refers to microporous membrane composites that do not dewet when subject to autoclave treatment in water at a temperature of about 135° C., or higher, in water for 40 minutes to 60 minutes or about 60 minutes. A microporous membrane composite sample can be prepared for autoclave testing by first wetting the sample with a solution containing methanol and water and then exchanging the methanol and water solution with water by flushing. The water exchanged sample can be autoclaved in a sealed container with water in an oven. If a microporous membrane support is not coated with sufficient crosslinked ionomer, subjecting such an incompletely coated sample to the autoclave treatment in water will cause the incompletely coated sample to de-wet and appear opaque following the autoclave treatment. Non-dewetting differs from a contact angle measurements of a microporous membrane's surface energy because non-dewetting refers to the wetting property of the microporous membrane throughout the membrane's thickness and pores, its liquid contacting a filtration surfaces, rather than just an outer surface of the microporous membrane.

Versions of the microporous membrane composite are wet with solutions containing methanol and water, the microporous membrane composites are not directly wet with water. The term "wettable" or "wettability" is used to refer to microporous membrane composites in a dry state that readily imbibes and/or absorbs solutions containing methanol and water, or solutions consisting essentially of methanol and water, into substantially all of its coated microporous structure in about 5 seconds or less without the use of heat, pressure, mechanical energy, surfactants or other prewetting agents. Microporous membrane composites in version of the present invention are not directly wettable with water even though the crosslinked ionomer coating has hydrophilic groups and the microporous membrane composite is non-dewetting following an autoclave treatment with water. Wettability can be measured by placing a single droplet of a methanol and water solution onto a portion of a microporous membrane composite sample from a height of about 5 centimeters or less directly onto the sample. The time for the droplet to penetrate the pores of the sample is then measured. A sample is considered to be wet by the methanol and water solution droplet if the droplet penetrated the pores of the sample within 5 seconds and the sample appeared transparent. If the droplet does not penetrate the microporous membrane composite sample, a methanol and water solution containing a higher weight percentage of methanol is used to retest the sample. In some versions of the invention the microporous membrane composite can be wet with a methanol and water solution containing 95 wt % or less methanol. In some versions of the invention the microporous membrane composites can be wet with methanol and water solutions containing 80 wt % or less methanol. In other versions of the invention the microporous membrane composites can be wet with methanol and water solutions containing 50 wt % or less methanol. In still other versions of the invention the microporous membrane composites can be wet with methanol and water solutions containing 30 wt % or less methanol. In yet still other versions of the invention the microporous membrane composites can be wet with methanol and water solutions containing between 20 wt % methanol and greater than 0 wt % methanol. In another version of the invention the microporous membrane composites can be wet with methanol and water solutions containing between 20 wt % methanol in water to 60 wt % methanol in water. In yet another version of the invention the microporous membrane composites can be wet with methanol and water solutions containing between 20 wt % methanol in water to 30 wt % methanol in water. Microporous membrane composites that are wet with methanol and water solutions containing less methanol have a higher surface energy and are even more resistant to dewetting. The surface tension of various methanol and water solutions are disclosed in U.S. Pat. No. 6,835,480, FIG. 3, incorporated herein by reference. Based on FIG. 3 in this reference, for the approximate weight percent methanol in water of: 80 wt %, 50 wt %, 25 wt % and 10 wt %, the corresponding approximate surface tensions for the solutions are about 27 dynes/cm, about 32 dynes/cm, about 43 dynes/cm, and about 55 dynes/cm respectively.

Microporous membranes composites in versions of the invention that are wettable with these methanol and water containing solution can be used in aqueous filtration applications where aqueous liquids can freely flow through them without dewetting the membrane. By "aqueous liquid" it is meant to include water, aqueous based liquids including but not limited to various aqueous products used in the semiconductor industry such as SC1 or SC2 cleaning baths, concentrated sulfuric acid with or without an oxidizer such as hydrogen peroxide or ozone, other aqueous based liquids in need of filtration such as aqueous solutions of a salt (buffered oxide etch), a base or an acid.

The coating of crosslinked perfluorinated ionomer on the microporous membrane can be characterized by absorption, transmission, or reflectance spectroscopy such as FTIR spectroscopy, solid state NMR, or UV/VIS spectroscopy. In some versions of the invention, densitometry is used to characterize the microporous membrane composite after staining with methylene blue dye as described herein. A reflection densitometer is an instrument which is used to measure the optical density of a surface and is sensitive or responsive to light reflected from a surface. The intensity of the reflected light can be used to measure the density of a stain or ink on a substrate like a microporous membrane composite. Optical density increases as a surface is made darker. Thus, a black surface is more dense than a grey surface, and a dark yellow surface is more dense than a light yellow surface.

The densitometric readings can be made at random points or regions on a methylene blue stained microporous membrane composite or at points or regions on a grid on a methylene blue stained microporous membrane composite.

In some versions of the invention, the microporous membrane composite has a mean densitometer value determined by densitometer readings of a methylene blue dye stained sample of the microporous membrane composite that is within ±9% of a mean densitometer value determined by densitometer readings taken of the methylene blue dye stained microporous membrane composite after 4 or more hours flow through contact with isopropyl alcohol solution containing 5000 parts per million by weight (ppm) 3M™ Novec™ FC 4432 fluorosurfactant at a temperature of between 70° C. and 80° C. at a flow rate of at least 80 milliliters per minute and in some cases a flow rate of from about 100 ml/min to about 120 ml/min through a 47 millimeter diameter sample of the methylene blue dye stained microporous membrane composite.

In other versions of the invention the microporous membrane composite has a mean densitometer value determined by densitometer readings of a methylene blue dye stained sample of microporous membrane composite, where the mean of densitometer readings on a methylene blue stained sample of microporous membrane composite does not differ at the 95% confidence limit by a Student-t test from the mean densitometer value determined by the densitometer of the same methylene blue dye stained sample of the microporous membrane composite after a treatment of 4 or more hours flow through contact with isopropyl alcohol containing 5000 parts per million by weight (ppm) 3M™ Novec™ FC 4432 fluorosurfactant at a temperature of between 70° C. and 80° C. at a flow rate of at least 80 ml/min through a 47 millimeter diameter sample of the methylene blue dye stained microporous membrane composite.

Some versions of methylene blue stained coated microporous membrane composites have mean densitometric readings, or other characterization property such as FTIR transmission intensity of hydrophilic groups, that varies by less than ±4% of the mean readings after treatment with the previously described hot isopropyl alcohol bath containing 5000 parts per million by weight (ppm) fluorosurfactant when compared to the mean of the characteristic property of the coated microporous membrane composite before treatment. In some versions of the invention the means before and after treatment are not different at the 95% Confidence Limit (CL). In some versions these means are not different at the 95% CL and the characterization property varies by less than ±4% of the mean after treatment with the hot isopropyl alcohol containing 5000 parts per million by weight (ppm) fluorosurfactant compared to the mean of the characteristic property of the microporous membrane composite before treatment.

The bound coating on the microporous membrane support also prevents dewetting of the membrane during exposure of the microporous membrane composite to gases such as air, as long as the microporous membrane composite is not exposed for a period of time sufficiently long to cause drying of the microporous membrane composite. During use in a filtration process, the filter can be exposed to air under small pressure differentials across the filter such as during a replacement of the liquid being filtered. Further, the microporous membrane composites in versions of this invention are particularly useful for filtering chemically active aqueous liquids such as acids or bases including those that can contain an oxidizer that produce gases or contains high concentrations of dissolved gases. In these instances, both the microporous membrane support and the crosslinked ionomer composition are highly resistant against chemical degradation, minimize flow loss, and provide a microporous membrane composite that is non-dewetting.

The microporous membrane composites in versions of the invention can be used with various supports and in various configurations in filter devices. The microporous membrane composite can be pleated with one or more support layers or nets, and potted with cage, support, and endcap structures to form various filter cartridges. The cartridges may be replaceable or they may be bonded into a housing. In cases where the microporous membrane composite is a hollow fiber, one or more hollow fibers may be potted to form a device.

The present invention will be further described with respect to the non-limiting examples below.

EXAMPLES

General Synthetic Methods and Test Procedures

Fluorocarbon liquid compositions containing from about 0.4 wt % to about 4 wt % of one or more fluorinated ionomers having an equivalent weight(s) of from about 380 g/eq to about 620 g/eq as described in Table 3 of Example 2 were used for coating the microporous membrane support. The fluorinated ionomers were derived from $CF_2$=CF—O—$CF_2CF_2SO_2F$ monomer units, tetrafluoroethylene, bis-olefin units of formula $CH_2$=CH—$(CF_2)_6$—CH=$CH_2$, and iodated chain transfer agent I—$(CF_2)_4$—I. The ionomers were dissolved in a fluorocarbon solvent like methylperfluorobutylether (Novec™ HFE⁻7100), a perfluoropolyether solvent like Galden® SV90, or a combination of these. These ionomer solutions were obtained from Solvay Solexis, and could optionally be filtered with 0.45 micron, 0.2 micron or smaller rated pore size filter microporous membrane prior to being used. Non-limiting examples of ionomer, radical initiator, and bis-olefin combinations that could be used in coating with HFE solvent are provided in Table 1. Each liquid fluorocarbon solution contained 0.6 wt % Luperox after dilution.

TABLE 1

Liquid fluorocarbon composition coating containing ionomer, radical initiator, and bis-olefin.

| Coating Composition Total Weight (grams) | Amount in grams of 4 wt % ionomer stock solution (contains 0.12 wt % bis-olefin) | | HFE (grams) in coating composition | Final ionomer content (wt %) in liquid fluorocarbon coating composition |
|---|---|---|---|---|
| | | Amount in grams of Luperox 101 ® solution @ 2 wt % | | |
| 40 | 5 | 12 | 23 | 0.5 |
| 40 | 7.5 | 12 | 20.5 | 0.75 |
| 40 | 10 | 12 | 18 | 1 |
| 40 | 13 | 12 | 15 | 1.3 |
| 40 | 20 | 12 | 8 | 2 |
| | | Amount in grams of Luperox 101 ® solution @ 5 wt % | | |
| 40 | 35.2 | 4.8 | 0 | 3.5 |

LUPEROX® 101 is 2,5-di(t-butylperoxy)-2,5-dimethylhexane, CAS 78-63-7, commercially available from Arkema. Bis-olefin crosslinker is 1,9-decadiene,3,3,4,4,5,5,6,6,7,7,8,8,-dodecafluoro ($CH_2$=CH—$(CF_2)_6$—CH=$CH_2$), CAS 1800-91-5, commercially available, for example, from Apollo Scientific, Ltd. In some cases the fluorinated ionomer solutions were combined with additional bis-olefin (3 wt % based on the ionomer weight) and an initiator (Luperox® 101, 3 wt % based on the ionomer weight), and diluted with HFE 7100 solvent and/or Galden® SV90 solvent to bring the solution to the proper ionomer weight percentage (0.4-4%) for coating.

The solution of the ionomer, radical initiator, and bis-olefin crosslinking agent were used to coat the polymeric microporous membrane support. In some cases the microporous membrane support was coated with the solution of the ionomer, radical initiator, and bis-olefin crosslinking agent by impregnation as described in U.S. Pat. No. 6,902,676. In some cases the microporous membrane support was coated with the solution of the fluorinated ionomer, radical initiator, and bis-olefin crosslinking agent solution by mechanical distribution using a roller. For mechanical distribution, excess solution of the fluorinated ionomer, radical initiator, and bis-olefin crosslinking agent was removed from the inert microporous membrane support for example with the roller, squeeze bars, or squeegee bars. The solvent was removed from the coated microporous membrane and crosslinking/curing performed at a temperature of from about 140° C. to about 180° C. in a closed container for about 10 minutes to about 60 minutes.

The transformation of the polymer sulphonyl groups ($-SO_2F$) into acid sulphonic groups ($-SO_3H$) was carried out by treating the cured coated microporous membrane support for about 4 h to about 8 hours or more at a temperature of from about 70° C. to about 85° C. in an aqueous KOH solution at about 10% KOH by weight, followed by washing the coated microporous membrane in demineralized water, and then treating this coated microporous membrane for about 2 hours to about 16 h at room temperature in a strong aqueous acid like HCl solution at 20% by weight or nitric acid at 20% by weight. This cured and activated microporous membrane composite was then washed with demineralized water.

This cured and activated microporous membrane composite was then extracted in hot water at a temperature ranging from about 80° C. to about 90° C. for about 30 minutes or for a sufficient time to remove unwanted anions and cations from the membrane.

Microporous membrane supports that were coated with the ionomer containing solution ranged in thickness from about 14 to about 20 microns and include pore sizes ranging from about 0.02 micron to about 0.1 micron as obtained from the manufacture (Gore). These PTFE microporous membranes were multilayered and included: 0.1 micron pore size microporous PTFE membranes; 0.05 micron pore size microporous PTFE membranes; 0.03 micron pore size microporous PTFE membranes; 0.02 micron pore size microporous PTFE membranes.

With some multilayer membranes, delamination was observed to occur during the boiling, or at about 100° C. for hot water, cleaning or extraction step. Without wishing to be bound by theory, water vapor generated during boiling in the coated membrane may have been responsible for the delamination. It has been discovered that by reducing the temperature of the extraction liquid below its boiling point, multilayer microporous composite membranes without delamination could be made.

Flow time and flow loss. Flow time is the time in seconds for 500 ml of isopropyl alcohol (IPA) or other liquid like water to flow through a 47 millimeter diameter sample of the microporous membrane support or a 47 millimeter diameter sample of the microporous membrane composite at a given pressure, usually 14.2 psi or 97,905.5 Pascals. These results can be converted to microporous membrane composite permeability. For example, for a 47 mm diameter microporous composite membrane sample, using a conversion of 14.7 psi/atm, permeability having units liter/(hour*$m^2$*atm), a 0.02 micron rated PTFE membrane that had a flow time for water at 11.5 psi of 670 seconds calculates to a permeability of about 1979.6 liter/hour*$m^2$*atm. When this microporous membrane was coated with 597 g/eq EW ionomer, 1.3 wt % ionomer coating concentration, the water flow time was 725 seconds which calculates to a water permeability of 1829.4 liter/hour*$m^2$*atm. For IPA flow loss tests, a Swinnex housing (Millipore Corp.) was used for 47 mm diameter microporous membrane support samples and microporous membrane composite samples. For water flow loss tests, a 47 mm diameter Savillex housing was used for microporous composite membranes and microporous membrane support samples. Flow loss was calculated using the formula:

Flow loss=100*[1−((average flow time uncoated membrane)/(average flow time coated membrane))]

A Non Dewetting Test was used to characterize the non-dewetting properties of microporous membranes composites and involves autoclaving a sample of the microporous membrane composite in a sealed vessel with water. Coated microporous membrane composite samples were mounted in a PFA holder and were prewet with IPA. The water flow time of the coated microporous membrane sample was measured at about 11.5 psi (79289.7 Pa); the water temperature was measured for water temperature correction and the result reported as a water flow time at 22.5° C.

Next, autoclave the coated microporous membrane composite sample in an oven with a temperature set at 135° C. The autoclave was performed for 1 hour in the water and then allowed to cool. Inspect the autoclaved sample disc for hydrophobicity, should be transparent if the microporous membrane composite is non-dewetting.

Measure water flow time of the autoclaved microporous membrane composite sample at a pressure of about 11.5 psi (79289.7 Pa); the water temperature was measured for water temperature correction and the result reported as a water flow time at or about a temperature of 22.5° C.

Wettability Test was used to characterize the surface energy of the microporous membrane composites. The composition of the liquid used to wet the surface of the microporous membrane composites could be related back to the surface energy in dynes/$cm^2$ of the microporous membrane composites. Make solutions of various weight percentages of methanol and water using a balance. Apply a drop of these methanol (MeOH)/water solutions to a 47 millimeter test sample of the microporous membrane composite from a height of 5 centimeters or less above the sample. Microporous membrane composites are wettable with the solution if in 5 seconds or less the test sample membrane changes from opaque to translucent thereby indicating that the membrane was wet with the MeOH/water solution. If wetting of the microporous membrane composite sample did not occur, a solution containing a greater amount of MeOH was used. If wetting did occur, a solution containing a lesser amount of MeOH was used. Various solutions containing methanol and water were used to evaluate the sample microporous membrane composite; the weight percent of methanol in the solution that wet the sample was reported.

Densitometry was used to characterize the coating on the microporous membrane composites before and after flow through contact of the composites with a hot isopropyl alcohol bath, at a temperature between about 70° C. to about 80° C., containing 5000 parts per million of 3M™ Novec™ FC 4432 fluorosurfactant. Microporous membrane composites and comparative microporous membrane supports coated with a non-crosslinked fluorinated coating of ionomer equivalent weight 850, available from Solvay Solexis, were stained with methylene blue by immersing the coated microporous membrane samples in a 0.1% aqueous solution of Methylene Blue dye until staining of the membrane surface occurred. These methylene blue stained microporous membrane supports with a non-crosslinked fluorinated coating of ionomer or microporous membrane composite samples were then washed sequentially in water, isopropyl alcohol, and then water, all while being agitated to remove excess dye from the stained microporous membrane samples.

Control densitometric readings were made at random points on a 47 mm diameter sample of the methylene blue stained coated microporous membrane samples before flow through treatment with hot fluorosurfactant containing IPA. The densitometric readings were made using a DensiEye 700 densitometer. The mean, standard deviation, and relative standard of the densitometer readings were calculated. The number of points sampled (N) for densitometry readings was not limited, in the examples the number of readings ranged from about N=10 to about N=20.

The 47 mm diameter sample of the methylene blue stained coated microporous membrane was mounted in a stainless steel membrane holder, disc area of about 17.4 $cm^2$.

Hot isopropyl alcohol bath at a temperature from, about 70° C. to about 80° C., containing 5000 parts per million of the fluorosurfactant, FC 4432 from 3M™ Novec™, was recirculated through the methylene blue stained and coated microporous membrane sample. The surfactant containing bath recirculated at a flow rate of at least 80 ml/min, depending on pore size this flow could range from about 80 milliliters per minute to about 120 milliliters per minute, for 4 to 10 hours from a volume of the IPA/Fluorosurfactant bath that was about 200 milliliters. Some bath volume loss occurred due to evaporation and was about 11% in 4 hr.

After flow through of the hot IPA/fluorosurfactant, the methylene blue stained coated microporous membrane sample was washed with IPA and allowed to dry. Densitometry measurements were again made at random points on the 47 mm diameter sample of the methylene blue stained coated microporous membrane composite or sample using the DensiEye 700 densitometer. The mean of the densitometer readings after contact or treatment was calculated.

The mean of the densitometer readings before contact (treatment) and the mean of the densitometer readings after contact (treatment) with the hot IPA and fluorosurfactant bath were compared statistically by a Student-t test at the 95% confidence limit, a limit traditionally used for chemical analysis, and differences between the means were also determined.

Example 1

Copolymers were obtained according to emulsion polymerization procedures disclosed in U.S. Pat. No. 6,902,676 by copolymerizing TFE and the vinyl ether of formula $CF_2=CF-O-CF_2CF_2-SO_2F$ and using the bis-olefin of formula $CH_2CH-C_6F_{12}-CHCH_2$ as pre-crosslinker $I-C_4F_8-I$ as chain transfer agent and potassium persulfate as radical initiator. The copolymers C1, C2, C3 and C4 were obtained under the following conditions shown in Table 2:

TABLE 2

| | Conditions to obtain copolymers C1, C2, C3 and C4. | | | | |
|---|---|---|---|---|---|
| Copolymer | Pre-crosslinker (vol % on vinyl ether) | Chain transfer agent (wt % on vinyl ether) | TFE partial pressure (bar) | Temperature (° C.) | Initiator (g/liter of water) |
| C1 | 0.22 | 1.3 | 5 | 60 | 0.46 |
| C2 | 0.22 | 1.3 | 5 | 60 | 0.46 |
| C3 | 0.16 | 1.0 | 5 | 60 | 0.46 |
| C4 | 0.31 | 1.5 | 5 | 70 | 1.3 |

Example 2

This example discloses the preparation of coating fluorinated ionomer solutions used in versions of this invention. The pre-crosslinked perfluoro ionomers prepared in Example 1, bearing iodine chain ends, were dissolved in a partially fluorinated or perfluorinated solvent in order to achieve final concentrations of about 4 wt %. The mixtures were then centrifuged at 10,000 rpm for two hours. One solution, S2*, was further centrifuged at 20,000 rpm for additional two hours. After removing insoluble residues, clear and transparent liquids were obtained, showing the physical properties as summarized in the following Table 3:

TABLE 3

| | | | Physical Properties solutions S1, S2, S2*, S3, and S4. | | | | | |
|---|---|---|---|---|---|---|---|---|
| Solution | Co-polymer dissolved | EW of Ionomer in solution | Solvent | Ionomer Content (wt %) | Iodine content (wt % on ionomer) | Intrinsic Viscosity (cm3/g) | Particle size (nm) | Applied in Examples: |
| S1 | C1 | 597 g/eq | HFE-7100 | 4.0 | 0.63 | 10.6 | 149 | 1, 5, 7-9, 11-13 |
| S2 | C2 | 557 g/eq | Galden SV90 | 4.0 | 0.61 | 10.8 | 37 | 15, 17 |

TABLE 3-continued

Physical Properties solutions S1, S2, S2*, S3, and S4.

| Solution | Co-polymer dissolved | EW of Ionomer in solution | Solvent | Ionomer Content (wt %) | Iodine content (wt % on ionomer) | Intrinsic Viscosity (cm3/g) | Particle size (nm) | Applied in Examples: |
|---|---|---|---|---|---|---|---|---|
| S2* | C2 | 555 g/eq | Galden SV90 | 4.0 | 0.63 | 10.6 | 16 | 18 |
| S3 | C3 | 512 g/eq | HFE-7100 | 4.0 | 0.8 | 8.8 | 88 | 2, 11 |
| S4 | C4 | 458 g/eq | Galden SV90 | 3.7 | 0.63 | 8.1 | 13 | 3, 8, 9, 11 |

Equivalent weight was calculated after determination of mole percentages of comonomers by means of NMR, after dissolution of 40 mg of the copolymer in 0.6 ml of hexafluorobenzene.

The iodine content of the ionomer was measured through X-ray fluorescence (XRF) and intrinsic viscosity was measured in Novec™ HFE-7100 at 30° C. using an Ubbelohde viscometer. Particle size was determined via application of the dynamic light diffusion method, measuring the hydrodynamic radius with the instrument formed by goniometer BI-200SM and correlator BI-9000AT, both commercial instruments of Brookhaven Instrument Co. Laser source was a Spectra-Physics series 2000 mod.2020/Ar 15 W. To obtain a clear scattering signal, the solutions were pre-diluted around tenfold with 0.22-micron filtered high-purity Novec™ HFE-7100. The setup determines the light diffusion coefficient which is then correlated to the mean particle diameter via the Stokes-Einstein relation (also known as Stokes-Einstein-Sutherland equation). All measurements affording the mean particle diameters as indicated in the table above have been executed in compliance with ISO standard #13321. Furthermore, the measurements deliver a "z-average" mean value corresponding to a weight-average mean particle size. Hence, the obtained average is dominated by the larger particle fractions and can therefore be considered a reliable identification of the largest particle fraction in the solution.

Example 3

This example discloses the fractionation observed after centrifugation. The pre-crosslinked copolymer C2 having an initial EW of 575 g/eq and iodine content of 0.71 wt % prior to dissolution was stirred in Galden SV90 at room temperature for 20 h. The mixture thus obtained was centrifuged at 10,000 rpm and 20° C. for 2 h and then 20,000 rpm and 20° C. for additional 2 hr, affording the transparent solution S2* and a solid residue, which was analyzed separately. Methods applied for equivalent weight (EW) and iodine content determination were the same as in Example 2. The results of the analyses are summarized in the following Table 4:

TABLE 4

|  | EW (g/eq) | Iodine content wt % (in polymer) |
|---|---|---|
| Starting copolymer C2 | 575 | 0.71 |
| Polymer in solution S2* | 555 | 0.63 |
| Insoluble residue | 616 | 0.65 |

It can be noted that the equivalent weight of the copolymer which is dissolved is significantly lower than the one which is separated as an insoluble residue. Iodine content, however, remains very similar in the two phases.

Example 4

This example describes isopropyl alcohol (IPA) Flow time and (Flow loss) measurements for a 0.03 micron pore size multilayer microporous PTFE membranes from Gore, coated with HFE based coating solutions containing 0.5 wt %, 0.75 wt %, 1 wt %, 1.3 wt %, 2 wt %, and 4 wt % ionomer content from the fluorinated ionomer (S1) solution as described in Example 2. The coating solutions also contained radical initiator, and bis-olefin. The coating solution was applied mechanically to coat the 0.03 micron rated pore size microporous membrane using a roller. The coated microporous membrane support was heated to 175° C. for about 30-60 minutes to crosslink the coating. The coating was activated to convert the transformable groups into hydrophilic groups with 80° C. KOH, followed by room temperature $HNO_3$ treatment and then washed with 90° C. hot deionized (DI) water. Flow loss tests were made on 47 mm disks of microporous membrane composite and are summarized in Table 5.

TABLE 5

IPA flow time for coated microporous membrane composite and percent flow loss compared to uncoated microporous membrane support for 0.03 micron rated multilayer membrane coated with a fluorocarbon liquid composition comprising the (S1) ionomer solution.

| Percent Ionomer conc. | Base membrane (IPA FT sec) | IPA flow time (sec/500 mls @14.2 psi - manual coating | Percent flow loss |
|---|---|---|---|
| 0.5% | 1085 | 1600 | 32% |
| 0.75% | 1085 | 2016 | 46% |
| 1.0% | 1085 | 3000 | 64% |
| 1.3% | 1085 | 3700 | 71% |
| 2.0% | 1085 | 4700 | 77% |
| 4.0% | 1085 | No flow | — |

The results show that percent flow loss for the microporous membrane composites increases with increasing percent ionomer distributed onto the microporous membrane support and that at a concentration of 4% ionomer, there is no IPA flow through the multilayer porous membrane. In one case a flow loss of 85% was observed using the 4 wt % ionomer (vide infra).

The results show that microporous membrane composites that have an IPA based percent flow loss compared to the uncoated microporous membrane support of 71% or less, or about 71% or less, could be made with ionomer percent concentration in the coating solution of 1.3 wt % or less, or about 1.3 wt % or less. The results also show that coated microporous composite membranes with IPA based percent flow loss compared to the base membrane of 77% less, or about 77% or less, could be made with ionomer percent concentration in the coating solution of 2 wt % or less, or about 2 wt % or less. The results show that the flow time of the microporous membrane composites decreased with decreasing concentration of ionomer used in the coating solution.

The results in Table 6 were obtained for microporous membrane composites made by distributing a coating solution using a roller onto a 0.02 micron pore size microporous membrane support. The microporous membrane was a multilayer PTFE membrane (Gore) and the coating solution comprised 597 g/eq ionome,r (S1) solution, at ionomer concentrations of 1.3 wt %. The control sample was an uncoated 0.02 micron pore size microporous membrane.

TABLE 6

Water flow time and methanol containing solution wettability of microporous membrane composite made from 0.02 micron pore size multilayer membrane coated with a fluorocarbon liquid composition comprising the (S1) ionomer solution.

| Weight percent ionomer | Water flow time at 11.5 psi (79289.7 Pa) seconds per 500 ml (cal. water permeability l/atm * hr * m²) corrected at 22.5° C. | Weight percent MeOH in water wettability |
|---|---|---|
| 0% (control, base microporous membrane) | 670 (1980) | |
| 1.3% (disc 1) | 725 (1829) | 40%-50% |
| 1.3% (disc 2) | 710 (1868) | 40%-50% |

The results show that a microporous membrane having pore size of 0.02 microns can be coated by distributing an ionomer solution onto the membrane to provide a microporous membrane composite that is wettable with a methanol and water solution that has between about 40 weight percent methanol in water to about 50 weight percent methanol in water. The microporous membrane composite has a calculated water permeability greater than 1800 l/atm*hr*m² for both disc samples based on the water flow time and a disc diameter of 47 millimeters. Such microporous membrane composites are beneficial in filtration applications because the high water permeability of the small pore sized microporous membrane composite can minimize the area of microporous membrane composite that is used or needed in a filter device thereby reducing costs and overall size of the filtration device.

Example 5

This example describes isopropyl alcohol (IPA) Flow time and (Flow loss) measurements for a 0.03 micron pore size multilayer microporous PTFE membranes (Gore), coated with HFE solvent based fluorocarbon liquid composition coating solutions comprising 1.3 wt % and 2 wt % content of ionomer from the (S3) solution of Example 2. The coating solution also contained radical initiator and bis-olefin as described in the General Synthetic Methods. The coating solution was applied mechanically to coat the 0.03 micron rated pore size microporous membrane using a roller. The coated membrane was heated to 175° C. for about 30-60 minutes to crosslink the coating. The coating was activated to convert the transformable groups into hydrophilic groups with 80° C. KOH, treated at ambient temperature with HNO₃, and washed with 90° C. hot DI water. Flow loss tests were made on 47 mm diameter disks of coated and cured microporous membrane support, results are in Table 7.

TABLE 7

IPA flow time for coated microporous membrane composite and percent flow loss compared to uncoated microporous membrane support for 0.03 micron rated multilayer membrane coated with a fluorocarbon liquid composition comprising (S3) solution . . .

| Percent Ionomer conc. | Base membrane (IPA FT sec) | IPA flow time (sec/500 mls @14.2 psi - manual coating | Percent flow loss |
|---|---|---|---|
| 1.3% | 1089 | 1994 | 45% |
| 2.0% | 1089 | 3500 | 69% |
| 1.3% (After 0.45u filtration) | 1085 | 2110 | 48% |

This example shows that percent IPA flow loss increases with increasing ionomer concentration distributed onto the microporous membrane support liquid contacting surfaces and pores using the roller.

The results show that an IPA flow loss of 69%, less than 82%, could be achieved by distributing a coating of ionomer from a fluorocarbon solvent onto a microporous membrane support with an ionomer content in the fluorocarbon liquid composition of 2 wt % or less. The percent flow loss at the same ionomer content as a percent was less for the ionomer (S3) than for the ionomer (S1) in Example 4.

Example 6

This example describes isopropyl alcohol (IPA) Flow time and (Flow loss) measurements for a 0.03 micron pore size multilayer microporous PTFE membranes (Gore) coated with Galden solvent based (majority of solvent is Galden SV 90 but minor amounts of HFE solvent are present from Luperox radical initiator) fluorocarbon liquid compositions comprising the (S4) solutions of Example 2 and containing 0.75 wt %, 1wt %, 1.3 wt %, 2 wt %, and 3.5 wt % ionomer content. Initiator, and bis-olefin were added to the coating solutions as described in the General Synthetic Methods. The coating solution was applied mechanically using a roller to coat the 0.03 micron pore size microporous membrane support. The coated membrane was heated to 175° C. for about 30-60 minutes to crosslink the coating. The coating was activated to convert the transformable groups into hydrophilic groups with 80° C. KOH and HNO₃ at ambient temperatures and was then washed with 90° C. hot DI water. Flow loss tests were made on 47 mm disks of the microporous membrane composites and microporous membrane supports, results are in Table 8.

TABLE 8

IPA flow time for microporous membrane composite and percent flow loss compared to uncoated microporous membrane support for 0.03 micron multilayer membrane support coated with a fluorocarbon liqud composition comprising the (S4) ionomer solution described in the Table of Example 2.

| Percent Ionomer conc. | Base membrane (IPA FT sec) | IPA flow time (sec/500 mls @14.2 psi - manual coating | Percent flow loss |
|---|---|---|---|
| 0.75% | 1085 | 1420 | 24% |
| 1.0% | 1085 | 1530 | 29% |
| 1.0% | 1085 | 1460 | 26% |
| 1.3% | 1085 | 1630 | 33% |
| 2.0% | 1085 | 1930 | 44% |
| 3.5% | 1085 | 2210 | 51% |

This example shows that percent IPA flow loss increases with increasing percent ionomer content applied by distributing the coating into the microporous membrane support. The results also show good repeatability (3% difference) for flow loss achieved for multiple samples with 1 wt % ionomer content in the coating solution.

The results show that an IPA flow loss of 51%, less than 82%, could be achieved by coating a microporous membrane with an ionomer concentration of 3.5 wt %. The percent flow loss at the same ionomer concentration percent was less for the fluorocarbon liquid compositon including the (S4) ionomer solution than for fluorocarbon compositions including either the (S3) or the (S1) ionomer solutions.

Example 7

This example shows the wettability range, the range of weight percent methanol in water, for various equivalent weight ionomers and ionomer concentrations that were used to coat 0.03 micron pore size multilayer PTFE microporous membrane supports. The crosslinked coated microporous membrane composites in this example were either those previously made in Examples 4-6 or made by the methods in Examples 1-6 and/or the General Synthetic Methods and Test Procedures.

TABLE 9

Weight percent methanol in water used to wet microporous membrane composites coated with different fluorocarbon liquid compositions with varying ionomer content.

| Ionomer concentration | S1 ionomer | S3 ionomer | S4 ionomer |
|---|---|---|---|
| 0.50% | 60-70% | — | — |
| 0.75% | 30-40% | — | 70-80% |
| 1.0% | 20-30% | — | 50-60% |
| 1.3% | 20-25% | 25-30% | 50-60% |
| 2.0% | 10-15% | 25-35% | 40-50% |
| 3.5% | — | — | 40-50% |
| 4.0% | 0 (<5 sec) | — | — |

Table 9 shows for example that a microporous membrane composite comprising a 0.03 micron microporous membrane support coated with a solution having an ionomer concentration of 0.75 wt % gives a microporous membrane composite that is wettable with 30 wt % to 40 wt % methanol in water. Similar descriptions can be made for other results in Table 9. For comparison, the wettability of a microporous membrane coated with a non-cross linked ionomer at a concentration of 0.785 wt % was about 80-85% MeOH.

Unexpectedly, the results of this example shows that for the same weight percent of ionomer in the coating solution that was used to coat the microporous membrane support, the lower the equivalent weight of the ionomer, the higher the amount of MeOH in water that needs to be used to wet the microporous membrane composite and make it translucent.

Depending upon the concentration of ionomer (wt %) in the coating solution, which can range from 0.5 wt % to at least 3.5 wt %, or about 0.5 wt % ionomer to about 3.5 wt % ionomer, and the equivalent weight of the ionomer which can range from 458 g/eq to 597 g/eq, or about 460 g/eq to about 600 g/eq, microporous membrane composites were made that are wettable with methanol and water solutions with percent methanol ranging from 10% by weight to 80% by weight, in some cases from 10% by weight to 70% by weight, in other cases from from 20% by weight to 60% by weight, and in still other cases from 20% by weight to 30% by weight.

The results of this example show that the microporous membrane composites are not directly wet with water. Further, the results show that as the percent concentration of the ionomer in the coating solution increases for a given equivalent weight, the percent methanol in the water that is used to wet the membrane also decreases. Less methanol in the water solution indicates that the surface energy of the coated microporous membrane composites was increased with increasing ionomer concentration.

Example 8

This example compares the preparation of porous membranes coated with fluorinated ionomer by an impregnation technique, (U.S. Pat. No. 6,902,676), with those prepared by mechanically distributing the amorphous fluorinated ionomer throughout the porous membrane by roller coating. These microporous membrane composite samples were prepared using (51) fluorinated ionomer precursor, crosslinker and radical initiator coating solution described in Example 2 and Example 4. The samples were cured and activated using the conditions in the General Synthetic Methods. In this example, the microporous base membrane support was 35 micron thick, had 0.1 micron rated pore size, and was a PTFE microporous membrane available from Gore. The coated microporous membrane composites in this example are compared by measuring the IPA flow time and percent flow loss, compositions and results are in Table 10.

TABLE 10

Impregnation coating results

| % Ionomer | % Initiator | Sample ID | Wettability MeOH | Flow Time (sec) | % Flow rate Loss |
|---|---|---|---|---|---|
| 0 | 0 | Disc 1 | — | 320 | — |
| 0 | 0 | Disc 2 | — | 410 | — |
| Control | | | | 365 | |
| 4 | 3 | Disc 1 | 10-15% | 1060 | 66% |
| 4 | 3 | Disc 2 | 10-15% | Phobic Spots | — |
| 2 | 3 | Disc 1 | 15-20% | 910 | 60% |
| 2 | 3 | Disc 2 | 15-20% | 1200 | 69% |
| Average | | | 15-20% | 1055 | 65% |
| 1 | 3 | Disc 1 | 15-20% | 670 | 45% |
| 1 | 3 | Disc 2 | 15-20% | 1006 | 64% |
| 1 | 3 | Disc 3 | 15-20% | 1120 | 67% |
| Average | | | | 932 | 58% |

Issues: Non-uniform dense spots

The data in Table 10 show that the impregnation method results in coated microporous membranes that showed little improvement on average in percent flow loss as lower weight percent ionomer concentrations (ionomer content) in the fluorocarbon liquid composition coating were used. There was only a 7% difference in flow loss on average between the 2 wt % and 1wt % ionomer coated samples. In one instance at 4 wt % ionomer concentration, hydrophobic spots were observed on the coated microporous membrane.

TABLE 11

Roller coating Results

| % Ionomer | % Initiator | Sample ID | Wettability MeOH | Flow Time (sec) | % Flow rate Loss |
|---|---|---|---|---|---|
| 0 | 0 | Disc 1 | — | 320 | — |
| 0 | 0 | Disc 2 | — | 410 | — |
| 4 | 3 | Disc 1 | 10-15% | No flow | — |
| 4 | 3 | Disc 2 | 10-15% | 2360 | 85% |
| 2 | 3 | Disc 1 | 15-20% | 1005 | — |
| 2 | 3 | Disc 2 | 15-20% | 595 | |
| Average | | | | 800 | 55% |
| 1 | 3 | Disc 1 | 15-20% | 575 | |

TABLE 11-continued

Roller coating Results

| % Ionomer | % Initiator | Sample ID | Wettability MeOH | Flow Time (sec) | % Flow rate Loss |
|---|---|---|---|---|---|
| 1 | 3 | Disc 2 | 15-20% | 570 | |
| Average | | | | 572 | 36% |

Distributing fluorinated ionomer containing solutions with a roller into the microporous membranes resulted in a flow loss of about 55% for 2 wt % ionomer in the coating, and a flow loss of about 36% for 1wt % ionomer in the coating as given in Table 11. In one instance at 4 wt % ionomer concentration in the coating, a flow loss of 85% was observed while in the other sample no flow was observed. There was a 19% difference in flow loss between the 2 wt % ionomer coating solution and the 1wt % ionomer coating solution. Wettability decreased with decreasing weight percent of ionomer in the coating solution.

The data in Table 10 and Table 11 illustrate that distributing ionomer throughout the microporous membrane support with a roller results a lower flow loss overall, 36% for roller coating versus 58% for the impregnation method for a coating solution containing 1wt % ionomer. Further, compared to the impregnation method, the percent flow loss varied more strongly with ionomer concentration for the roller method. By distributing the coating solution with the roller, coated microporous membrane composites with less flow loss could be made. Both methods resulted in microporous membranes with similar wettability.

Example 9

This example illustrates the non-linear relationship between methanol wettability (weight percent methanol in water) and ionomer concentration or ionomer content (weight percent) used in the coating on 0.03 micron pore size PTFE microporous membrane supports (available from Gore). The microporous membrane supports were coated with fluorocarbon liquid compositions comprising different equivalent weight amorphous ionomers (S1) 597 g/eq, (S3) 512 g/eq, and (S4) 458 g/eq as described in Example 2. The composite membranes in this example were either those previously made in Examples 4-6 or made by the methods in Examples 4-6 and/or the General Synthetic Methods and Test Procedures.

As shown in FIG. 1, the wettability of the microporous membrane composites coated with fluorocarbon liquid compositon containing (S3) are intermediate between those coated with fluorocarbon liquid composition containing (S4) and those coated with the fluorocarbon liquid composition containing (S1). Expect the weight percent of methanol in water used to wet microporous membrane composites made with (S3) ionomer to increase as ionomer concentration used decreases.

The results of this example show that wettability decreases in a non-linear manner with decreasing ionomer concentration or ionomer content (as a weight percent) in the coating solution used to coat the microporous membrane support.

The results in FIG. 1 also show that wettability decreases with decreasing ionomer equivalent weight; for example at 2 wt % ionomer content, a microporous membrane coated with a fluorocarbon liquid composition comprising the (S1) solution has better wettability (wettable with about 12 wt % MeOH in water) than a microporous membrane coated with a fluorocarbon liquid composition comprising the (S3) solution (wettable with about 30 wt % MeOH in water), which is more wettable than a microporous membrane coated with a fluorocarbon liquid composition comprising the (S4) solution (wettable with about 45 wt % MeOH in water). This is unexpected since without wishing to be bound by theory, lower equivalent weight ionomers were expected to have a higher density of hydrophilic groups and should accordingly be more hydrophilic.

Example 10

This example describes the percent flow loss for a fluorocarbon liquid composition comprising the (S1) solution diluted to have a 1.3 wt % ionomer content. The liquid compositon includes cross linker and radical initiator; the fluorocarbon liquid composition is distributed onto microporous membrane support surfaces and pore surfaces. The microporous composite membranes in this example were either those previously made in Examples 4 or made by the methods in Examples 4 and/or the General Synthetic Methods and Test Procedures along with the solutions from Example 2. For IPA flow loss tests, a Swinnex housing (Millipore Corp.) for 47 mm porous membrane samples was used to hold the sample microporous membrane composite.

For a 0.03 micron pore size multilayer microporous membrane, the flow loss percent of the microporous membrane composite in IPA was 71% or about 71%, as calculated based on an IPA flow time of about 3700 sec for the microporous composite membrane and a flow time about 1085 seconds for uncoated microporous membrane support; this microporous membrane composite sample was wettable with about 24 wt % MeOH in water.

For a 0.05 micron pore size multilayer microporous membrane support, the IPA flow loss for the microporous membrane composite was about 55% as calculated from an IPA flow time of about 1300 sec for the microporous membrane composite and about 600 seconds for uncoated microporous membrane support for 500 milliliters of IPA; this microporous membrane composite sample was wettable with about 22 wt % MeOH in water.

For a 0.1 micron rated pore size microporous membrane support, single retentive layer, the IPA flow loss was about 42%, as calculated from an IPA flow time of about 600 sec for the microporous membrane composite and about 350 for the uncoated microporous membrane support; this microporous membrane composite sample was wettable with about 18 wt % MeOH in water.

The results of this Example show that microporous membrane composites with a flow loss of about 71% or less and wettability with MeOH in water solutions having about 25 weight % MeOH or less can be made using fluorocarbon liquid compositions comprising the (S1) ionomer solution at 1.3 wt % ionomer concentration; the microporous membrane composites can be made with microporous membrane supports having pore size in the range of about 0.03 microns to 0.1 microns.

Example 11

This example details water flow loss and non-dewetting tests that were performed on microporous membrane composites comprising 0.1 micron and 0.03 micron microporous membrane supports coated with crosslinked fluorinated ionomer. The non-dewetting test method includes mounting a 47 millimeter diameter sample of microporous membrane composite in a PFA holder from Savillex, the microporous membrane composite was prewet with IPA.

After flushing the IPA from the microporous membrane composite, the water flow time was measured at a pressure of about 11.5 psi. (79289.7 Pa); measured water temperature for temperature correction and reported the flow time at 22.5° C. in the Tables below.

Next the microporous membrane composite sample was autoclaved in water in a sealed container. The oven used for the autoclave was set at a temperature of 135° C., the sample was autoclaved for 1 hour and then cooled.

Inspected the autoclaved microporous membrane composite disc for hydrophobicity and then after mounting in the Savillex holder, re-measured water flow time at about 11.5 psi (79289.7 Pa); measured water temperature for temperature correction and reported the flow time at 22.5° C.

Water flow time, before and after water autoclave, and non-dewetting results are summarized in the Tables below for various microporous membrane support pore sizes, ionomer coating solutions, and concentration of ionomer (wt %) used to coat the membrane. The microporous membrane composites in this example were either those previously made in Examples 4-6 or were made by the methods in Examples 4 and 6 with solutions from Example 2 and/or the General Synthetic Methods and Test Procedures.

The water flow time of a 47 mm diameter, 0.1 micron pore rate microporous membrane sample coated using 1 weight % ionomer (after cure, activation and prewet) that was measured at 11.5 psi/22.5° C./500 milliliter volume of water was 465 seconds. This calculates to a water permeability of about 2852 liter/atm*hr*m$^2$.

The results in Table 12 were obtained for microporous membrane composites made by coating microporous 0.03 micron pore size multilayer PTFE membrane (Gore), with a fluorocarbon liquid composition comprising (S1) solution from Example 2 to give ionomer at concentrations of 0.5 wt %, 0.75 wt %, and 1wt %. Non crosslinked designates a microporous membrane coated with ionomer that is not crosslinked.

TABLE 12 microporous membrane composite water flow time and dewetting made from 0.03 micron pore size membrane coated with fluorocarbon liquid composition comprising the (S1) solution.

| Weight Percent (wt %) Ionomer content from (S1) in liquid composition | Water flow time, before autoclave, sec per 500 ml (cal. water permeability l/atm * hr * m$^2$) | Water flow time, after autoclave, sec per 500 ml (cal. water permeability l/atm * hr * m$^2$) | Percent Dewetting after autoclave |
|---|---|---|---|
| Non crosslinked (0.78) | 800-1110 (1658-1206) | 750-1100 (1768-1396) | 0 |
| 0.5 | 876 (1514) | 839 (1581) | 0 |
| 0.75 | 1298 (1022) | 1088 (1219) | 0 |
| 1.0 | 1252 (1059) | 996 (1332) | 0 |

The results in Table 12 show that the 0.03 micron pore size multilayer microporous membrane composites made with a fluorocarbon liquid composition comprising the (S1) solution are non-dewetting by water autoclave test and that water flow time decreases for crosslinked samples after autoclave; the calculated water permeability also increases after autoclave treatment. Based on the water flow time, the calculated water permeability for these coated microporous membrane composites is greater than 1000 l/atm*hr*m$^2$ and in some cases is greater than 1200 l/atm*hr*m$^2$.

The results in Table 13 were obtained for microporous membrane composites made by coating microporous 0.03 micron pore size, multilayer PTFE membrane (Gore) with fluorocarbon liquid composition comprising the (S4) solution to give compositions with ionomer concentrations of 0.75 wt %, 1 wt %, 1.3 wt %, 2 wt %, and 3.5 wt %. Non crosslinked designates a micropoous membrane coated with ionomer that is not cross linked.

TABLE 13 microporous membrane composite water flow time and dewetting for 0.03 micron rated pore size membrane coated with a fluorocarbon liquid composition comprising the (S4) solution.

| Wt Percent Ionomer from (S4) in liquid composition | Water flow time, before autoclave, sec per 500 ml (cal. water permeability l/atm * hr * m$^2$) | Water flow time, after autoclave, sec per 500 ml (cal. water permeability l/atm * hr * m$^2$) | Percent Dewetting after autoclave |
|---|---|---|---|
| Non crosslinked (0.78) | 800-1110 (1658-1206) | 750-1050 (1768-1263) | 0 |
| 0.75 | 1154 (1149) | 1058 (1256) | 0 |
| 1.0 | 1327 (1000) | 999 (1328) | 0 |
| 1.0 | 1161 (1142) | 1021 (1299) | 0 |
| 1.3 | 1000 (1326) | 938 (1414) | 0 |
| 2.0 | 1368 (970) | 1051 (1262) | 0 |
| 3.5 | 1515 (876) | 1181 (1123) | 0 |

The results in Table 13 show that the coated microporous membrane composites made with with a fluorocarbon liquid composition comprising the (S4) solution are non-dewetting after autoclave treatment. Calculated water permeability is greater than 1000 l/atm*hr*m$^2$ for the samples, especially after autoclaving. In some cases the calculated water permeability based on water flow time is greater than 1200 l/atm*hr*m$^2$.

Example 12

This example illustrates the methanol wettability, isopropyl alcohol flow time, and flow loss for microporous membrane composites prepared with a mixture of different ionomers having different equivalent weights. This example uses a multilayer PTFE microporous membrane support from Gore, with an average 0.03 micron pore size. The fluorocarbon liquid composition includes a 50:50 combination or mixture of fluorinated ionomers having equivalent weights of about 460 g/eq and about 600 g/eq from the fluorinated ionomer solutions (S4) and (S1) respectively in Example 2. The microporous membrane support was roller coated by the method in Example 4 and General Methods and Materials. Table 14 below compares the wettability and IPA flow time of the microporous membrane support coated with a fluorocarbon liquid composition comprising 1.3 wt % ionomer mixture comprising a 50 wt %:50 wt % mixture of (S4) and (S1) solutions with microporous membrane composites prepared in Examples 4-6 separately having 1.3 wt % ionomer content from (S4) solution and (S1) solution also on 0.03 micrometer pore size microporous membrane support (16 micron thick, 4 layer). (14.4 psi=99284.5 Pa).

TABLE 14

| Sample | Percent Methanol Wettability | IPA Flow time @14.4 psi | Percent flow loss |
|---|---|---|---|
| Control | — | 1050 | — |
| 1.3% (466/590) | 30 | 1880 | 44% |
| 1.3% (466) | 50-60 | 1630 | 33% |
| 1.3% (590) | 20-30 | 3700 | 71% |

The results in Table 14 show that a 1.3% wt/wt coating concentration containing a 50:50 mixture of fluorinated ionomers from (S4) and (S1) has wettability with a solution containing 30% methanol in water and an IPA flow time of 1880 seconds. The 1.3 wt % (S1/S4) microporous membrane composite is wet with a 30 weight % methanol in water solution which is within the 20 wt % Methanol to 30 wt % Methanol range for solutions used to wet the microporous membrane composite coated with liquid composition comprising (S1) alone and is better that the wettability of the microporous membrane composite coated with a liquid composition comprising (S4) alone (50 wt % MeOH to 60 wt % MeOH). The percent flow loss for the 1.3% (S1/S4) microporous membrane composite was 44% which was higher than the flow loss of the (S4) based microporous membrane composite (33%) and lower than the flow loss of the (S1) based coated microporous membrane composite alone (71%).

These results also show that lower equivalent weight crosslinked ionomer coatings on high surface area microporous membrane supports are less wettable but have better flow loss properties, than similar coatings made with higher equivalent weight crosslinked ionomer coatings. This was unexpected. While low equivalent weight crosslinked ionomer coatings were suitable for filtration applications, a thin crosslinked coating comprising a combination of one or more low equivalent ionomers and one or more high equivalent ionomers also provided coated microporous membrane composites with flow loss in isopropyl alcohol that was 82% or less and that were wet with solutions containing methanol and water and that are non-dewetting by an autoclave test.

Example 13

This example shows the change in water permeability with percent fluorinated ionomer crosslinked on a microporous membrane support, the microporous membrane has a thickness of 40 microns from Examples 4 and 5 from U.S. Pat. No. 6,902,676. Example 4 from this reference specified 40 micron thick membrane with a 0.2 micron pore diameter. Example 5 from this reference only specified a 40 micron thick membrane that was porous but did not disclose a pore size. Since Examples 2, 7, 11, and Comparative Example D in this reference used 40 micron thick membrane with 0.2 micron porosity, it was assumed for this example that the pore size for example 5 of U.S. Pat. No. 6,902,676 was also 0.2 micron.

Figure 2:
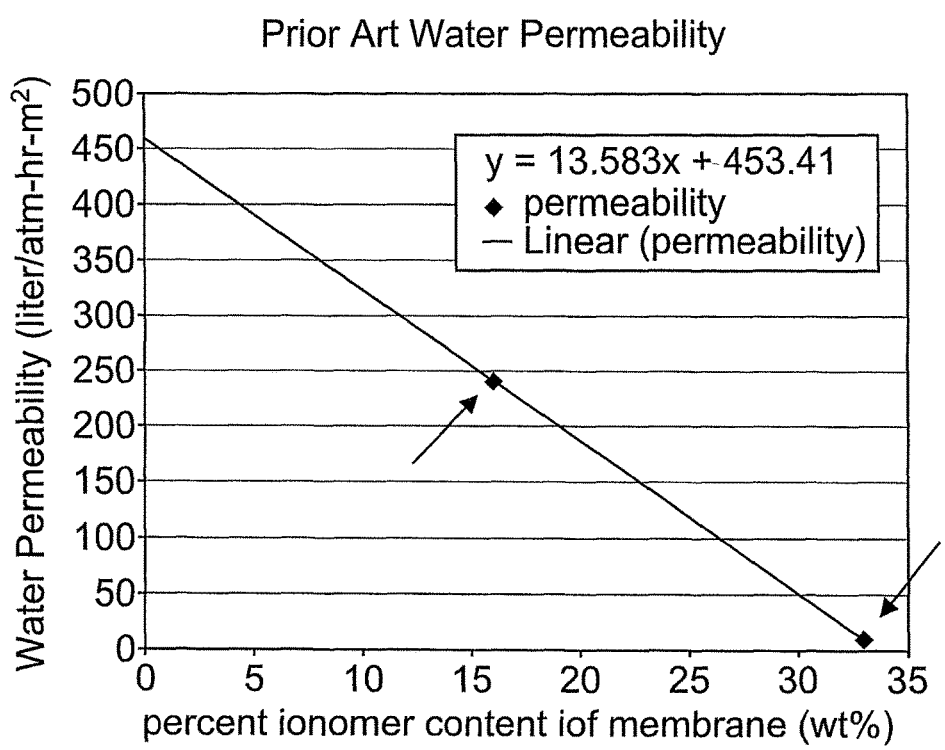
FIG. 2 illustrates the expected water permeability (y-axis units liter/atm*hr*m$^2$) for crosslinked coated porous membranes in U.S. Pat. No. 6,902,676 with between 33 percent of the total weight (ionomer and PTFE support) to 16 percent of the total weight (ionomer and PTFE support) of 588 g/eq EW ionomer (arrows show these points).

This graph shown in FIG. 2 illustrates that the expected water permeability (y-axis units liter/atm*hr*m$^2$) would range from about 25 l/atm*hr.*m$^2$ to 250 l/atm*hr.*m$^2$ for crosslinked coated porous membranes in U.S. Pat. No. 6,902,676 with between 33 percent of the total weight (ionomer and PTFE support) to 16 percent of the total weight (ionomer and PTFE support) of 588 g/eq EW ionomer (arrows show these points).

Unexpectedly, microporous membrane composites in some versions of the present invention with between about 25% of the total weight as coating and 30% of the total weight as coating (ionomer and support, see Example 13, vide infra) have water permeabilities of 1000 l/atm*hr.*m$^2$ (based on water flow time) or greater. Permeabilities of 1000 l/atm*hr.*m$^2$ or greater would lie as points above the line shown in this graph even though the pore size of the microporous membrane in the examples are smaller (0.1 microns to 0.02 microns) than the 0.2 micron pore size of the porous membrane used in U.S. Pat. No. 6,902,676. Without wishing to be bound by theory, a thin coating of the crosslinked fluorinated ionomer on the high surface area of the microporous membrane supports used in the present invention results in similar weight add on but higher water permeability compared to the porous membrane and methods used in U.S. Pat. No. 6,902,676.

Example 14

This example compares the densitometer readings of microporous membrane composites stained with methylene blue dye before and after 4 or more hours flow through contact with isopropyl alcohol containing 5000 ppm fluorosurfactant at a temperature of from about 70° C. to about 80° C. and at a flow rate of between 80 ml/min to 120 ml/min. The flow rate could vary depending on membrane pore size and temperature. The flow through contact of the fluorosurfactant solution was performed on a 47 mm sample of the methylene blue dye stained microporous membrane composite. The densitometer measurements that were made at various points on the methylene blue dye stained samples of microporous membrane composite. These measurements were recorded before and after flow through contact or treatment of the stained sample in the bath containing 5000 ppm fluorosurfactant FC 4432 from 3M™ Novec™ in hot isopropyl alcohol at a temperature of between 70° C. to 80° C. A microporous membrane coated with a perfluorinated ionomer that was not crosslinked was also evaluated by densitometry.

Microporous membrane composite samples were held in a stainless steel membrane holder; the disc area of the samples used was 17.35 cm$^2$ (47 mm). Hot isopropyl alcohol (IPA) with the surfactant was recirculated through the membrane sample from a reservoir of about 200 milliliters at a flow rate that was about 100 ml/min to about 120 ml/min. Time for treatment was generally 4 hours but was as long as 10 hours in one case.

The microporous membrane composites in this example were either those previously made in Examples 4-6 or those made by the methods in Examples 4-6 and/or the General Synthetic Methods and Test Procedures.

The densitometer readings were made using a DensiEye 700 reflectometer. The densitometer readings were statistically evaluated by a Student-t test, the results are provided in Table 15.

In Table 15, the −8.39% difference in densitometer reading mean for the microporous membrane composite coated with a fluorocarbon liquid composition comprising (51) ionomer content (1.3 wt %) indicates that the mean of the densitometer readings measured after flow through with hot IPA/fluorosurfactant was higher compared to the mean of the densitometer readings of the control microporous membrane composite sample without flow through with hot IPA/fluorosurfactant. This sample was treated for 10 hours as noted.

The results in Table 15 show that for the microporous membrane coated with un-crosslinked 850 g/eq equivalent weight ionomer, the mean of the densitometer readings of the sample before contact with the hot fluorosurfactant and isopropyl alcohol bath and the mean of the densitometer readings of the sample after contact with the hot fluorosurfactant and isopropyl alcohol bath were different at the 95% confidence limit by a Student-t test, and the difference between these means was greater than ±9%.

between −9% and 9% as shown for the 597(S1)/(0.75), 597(S1)/(1), 597(S1)/(1.3)10 hr, 597(S1)/(1.3), 597(S1)/(1.3), and 512(S3)/(2) microporous membrane composites in Table 15.

In some cases of this example, as shown by the 597(S1)/(0.75), 597(S1)/(1), 597(S1)/(1.3), and 512(S3)/(2) microporous membrane composites in the Table, the mean of the densitometer readings of the sample before contact with the hot fluorosurfactant and isopropyl alcohol bath and the mean of the densitometer readings of the sample after contact with the hot fluorosurfactant and isopropyl alcohol bath had a difference of less than ±4%.

The results show that for the microporous membrane composites coated with crosslinked ionomer, the mean of the densitometer readings of the sample before contact with the hot fluorosurfactant and isopropyl alcohol bath and the mean of the densitometer readings of the sample after contact with the hot fluorosurfactant and isopropyl alcohol bath were not different at the 95% confidence limit by a Student-t test, as shown for the 597(S1)/(0.5), 597(S1)/(1.3), 512(S3)/(2), and 458(S4)/(1) microporous membrane composites.

The results also show that for the microporous membrane composites coated with crosslinked ionomer, the difference between the mean of the densitometer readings of the sample before contact with the hot fluorosurfactant and isopropyl alcohol bath and the mean of the densitometer readings of the sample after contact with the hot fluorosurfactant and isopropyl alcohol bath were between −9% and

TABLE 15

| Ionomer EW(g/eq) and solution designation from Example 2/Ionomer Conc.(wt %) | N Before | N After | Mean and (SD) of Densitometer readings Before | Mean and (SD) of Densitometer readings After | t-exp | P-type 1 error | Difference Means B − A (percent) | Color density means at 95% CL |
|---|---|---|---|---|---|---|---|---|
| 850 (no x-link)/ (0.78) | 10 | 10 | 0.922 (0.067) | 0.835 (0.049) | 3.31 | 0.0039 | 0.087 (9.4) | Means ARE different |
| 597 (S1)/(0.5) | 10 | 10 | 2.221 (0.634) | 1.708 (0.453) | 2.08 | 0.0518 | 0.513 (23.1) | Means NOT different |
| 597 (S1)/(0.75) | 20 | 20 | 1.56 (0.055) | 1.525 (0.049) | 2.13 | 0.0399 | 0.035 (2.24) | Means ARE different |
| 597 (S1)/(1) | 20 | 20 | 1.725 (0.093) | 1.662 (0.041) | 2.74 | 0.0093 | 0.063 (3.65) | Means ARE different |
| 597 (S1)/(1.3) 10 hr | 20 | 20 | 1.562 (0.064) | 1.693 (0.241) | 2.35 | 0.0239 | −0.131 (−8.39) | Means ARE different |
| 597 (S1)/(1.3) | 20 | 20 | 1.609 (0.177) | 1.599 (0.087) | 0.24 | 0.81 | 0.01 (0.622) | Means NOT different |
| 597 (S1)/(1.3) | 20 | 20 | 1.642 (0.106) | 1.496 (0.09) | 4.66 | 3.8E−5 | 0.146 (8.89) | Means ARE different |
| 512 (S3)/(2) | 10 | 10 | 1.618 (0.106) | 1.581 (0.167) | 0.59 | 0.562 | 0.037 (2.28) | Means NOT different |
| 458 (S4)/(1) | 10 | 10 | 1.911 (0.746) | 1.574 (0.614) | 1.10 | 0.285 | 0.337 (17.6) | Means NOT different |

The results in Table 15 show that for the microporous membrane composites coated with crosslinked fluorinated ionomer, the difference between the mean of the densitometer readings of the sample before contact with the hot fluorosurfactant and isopropyl alcohol bath and the mean of the densitometer readings of the sample after contact with the hot fluorosurfactant and isopropyl alcohol bath were 9% and the means were not different at the 95% confidence limit, for example for the 512(S3)/(2), and 597(S1)/(1.3) samples.

The relative standard deviation of the mean densitometer readings was used to characterize the uniformity of the ionomer coating on the microporous membrane composites. The relative standard deviation was calculated by dividing the standard deviation by the mean. For example before treatment with hot IPA and surfactant the relative standard deviation for the 597(S1)/(0.05) sample was 0.29; the relative standard deviation for the 458(S4)(1) sample was 0.39, and the relative standard deviation for the 597(S1)/(1) sample was 0.054; these relative standard deviations are below 0.4.

Example 15

This example shows the ion exchange capacity (IEC) of a microporous membrane composite before and after treatment in an SC1 bath. The microporous membrane composite comprised a microporous membrane support, 0.03 micron pore size multilayer microporous PTFE membrane from (Gore), and an amount of a coating comprising an amorphous crosslinked fluorinated ionomer on surfaces including pores of the microporous membrane support. The composite membranes in this example were either those previously made in Examples 4 or made by the methods in Examples 4 and/or the General Synthetic Methods and Test Procedures.

The IEC of the composite membrane was measured before exposure to the SC1 solution. The microporous membrane composite sample was then soaked in (5:1:1 SC1 solution of water:ammonium hydroxide:hydrogen peroxide) at 80° C. for 30 min. After about 30 minutes the used SC1 solution was replaced with fresh SC1 mixture (two half-lives). This procedure was repeated six times.

Following this treatment in the SC1 solution, the microporous membrane composite was washed, regenerated, and dried. The ion exchange capacity was measured again.

| | |
|---|---|
| IEC before exposure SC1 bath | 158 nM/sq.cm |
| IEC after exposure SC1 bath | 161 nM/sq.cm |

The results show that the ion exchange capacity of the membrane was essentially the same, within experimental error, before and after the treatment in the SC1 solution. Without wishing to be bound by theory, the higher surface area of the 0.03 micron microporous membrane support is believed to be the reason for the higher ion exchange capacity (IEC) than 0.1 micron membrane in the following example (vide infra).

Example 16

This example characterizes the bubble point, ion exchange capacity, and weight add on for microporous membrane composites coated with a fluorocarbon solution comprising (51) solution from Example 2 and radical initiator (3 wt %). The fluorocarbon comprising coating solutions had ionomer content varying from 0wt % to 4 wt % as detailed in Table 16. The effect of the crosslinked coating on the microporous membrane support is measured by a change in the mass gain of the inert microporous membrane support (percent weight added), an increase in IPA bubble point of the inert microporous membrane support (bubble point correlates to particle retention by the porous composite membrane, a higher bubble point indicates a higher retention for the same size particle), and the ion exchange capacity (IEC) of the coated microporous membrane support. The composite membranes in this example were either those previously made in Example 4 or made by the methods in Example 4 and/or the General Synthetic Methods and Test Procedures using the (S1) solution in Example 2 by roller coating on a 0.1 micron rated pore size PTFE microporous membrane having a total thickness of about 35 microns.

TABLE 16

Bubble point, ion exchange capacity, and weight add on for microporous membrane composites coated with a fluorocarbon solution comprising (S1) solution from Example 2

| % ionomer | % initiator | IPA Bubble point (psi) | IEC (nmol/sq cm) | % Wt. Add |
|---|---|---|---|---|
| 0 | 0 | 34.2 | 0 | 0 |
| 4 | 3 | 44.1 | 105 | 29.4 |
| 2 | 3 | 40.7 | 98.7 | 27.6 |
| 1 | 3 | 39.2 | 123 | 27.3 |

The results show that the IPA bubble point of the microporous membrane composites by air flow porosimetry increases with increasing percent fluorinated ionomer concentration used in the coating solution to coat the microporous membrane support. The increasing IPA bubble point indicates that the pore size of the coated microporous membrane composite decreased with an increasing concentration of ionomer in the coating solution.

The ion exchange capacity (IEC) was determined by potentiometric titration on 47 millimeter diameter disk samples of the microporous membrane composites. For the fluorocarbon liquid composition comprising 1 wt % to 4 wt % of ionomer from (S1) used to make the porous membrane composites in this example, the IEC was in the range of about 95 nanomoles/square centimeter to about 125 nanomoles/square centimeter. This IEC is lower than for the smaller pore size membrane in Example 12.

The percent weight added to the microporous membrane support by the amorphous coating is about 25 weight percent to about 30 weight percent, or 25 weight percent to 30 weight percent.

Example 17

This example compares the wettability of a crosslinked microporous membrane composite in a version of the present invention that had a surface energy of between about 40-51 dynes/cm with the wettability of a surface modified 0.03 micron microporous membrane coated with non-crosslinked ionomer that had a surface energy of about 28-32 dynes/cm. The crosslinked microporous membrane composite was prepared from a 0.03 micron PTFE microporous membrane support coated with a fluorocarbon liquid composition comprising bis-olefin and (S1) solution from Example 2. The fluorocarbon solution was diluted with solvent to give a 1.3 wt % ionomer content according to the general synthetic methods and test procedures.

TABLE 17

Wettability of surface modified 0.03 micron microporous membrane.

| Liquid Composition or process application liquid | Approximate Surface tension of Liquid in col. 1 (dynes/cm) | 0.03 micron rated pore size surface modified microporous membrane, surface energy 28-32 dyne/cm (non-crosslinked) | 0.03 micron rated pore size microporous membrane composite, surface energy 40-51 dyne/cm (crosslinked) |
|---|---|---|---|
| Hot water 60° C.-80° C. | 60-63 | No wetting | Wet in less than 5 min |
| SC1 Bath (5:1:1) 60° C.-80° C. | NA | No wetting | Wet in less than 5 min |
| NMP (N-Methylpyrrolidone) | 40.1 | No wetting | Instant wetting |
| Ethyl lactate | 28.7 | No wetting | Instant wetting |
| 0.1% Triton | 27.7 | No wetting | Wetting (<1 min) |
| PGMEA (propylene glycol monomethyl ether acetate) | 27-28 | Instant wetting | Instant wetting |
| PGME (propylene glycol monomethyl ether) | 28 | Instant wetting | Instant wetting |
| 2-methyl butanol | 24.8 | Instant wetting | Instant wetting |
| cyclohexanone | 34.1 | No wetting | Instant wetting |

The results in Table 17 show that the microporous membrane composite having a surface energy of 41 dynes/cm or more, can be directly wet with different process chemicals having a range of surface energies. In some cases even though wetting was slower, 5 minutes or less, the membrane composite could be used without prewetting and generation of solvent waste. Depending upon the surface energy of the microporous membrane composite and the surface tension of the application liquid, filters containing microporous membrane composites in versions of the invention can be packaged and shipped dry for use without water or the need for pre-wetting with organic solvent. This can reduce manufacturing costs by eliminating autoclave and shipping costs associated with filters packaged with water and can reduce solvent waste generated during wetting, flushing and solvent exchange procedures following filter installation.

Example 18

This example describes isopropyl alcohol (IPA) Flow time and wettability for 0.03 micron rate pore size multilayer microporous PTFE membranes from Gore, coated with Galden® SV90 solvent based (majority of solvent was Galden SV90 but minor amounts of HFE solvent were present from Luperox®) fluorocarbon liquid compositions that include 0.75 wt %, 1 wt %, 1.3 wt % concentrations of 557 g/eq equivalent weight ionomer (S2) solution. The coating solution also contained radical initiator, and bis-olefin as described in the General Synthetic Methods. The coating solution was applied mechanically to coat the 0.03 micron rated pore size microporous membrane using a roller. The coated microporous membrane was heated to 175° C. for about 30 minutes to about 60 minutes to crosslink the coating. The coating was activated to convert the transformable groups into hydrophilic groups with 80° C. KOH and room temperature $HNO_3$ treatment and then washed with 90° C. hot DI water. Flow loss tests were made on 47 mm disks of coated membrane.

The average flow time on three samples of the uncoated base microporous membrane support was 1050 seconds. This was used to calculate the percent flow loss and the results presented in Table 18.

TABLE 18

Flow time average and wettability.

| Sample | Ionomer concentration (wt %) in fluorocarbon liquid compositon | Microporous membrane composite IPA flow time (seconds) @14.2 psi/500 ml and (percent flow loss) | Weight percent Methanol in water used to wet microporous membrane composite |
|---|---|---|---|
| | 0.75 | 3425 | 35 |
| | 0.75 | 2950 | 35 |
| Average | | 3188 (67% flow loss) | |
| | 1 | 4300 | 20-25 |
| | 1 | 3600 | 20-25 |
| | 1 | 4450 | 20-25 |
| | 1 | 4000 | 30 |
| | 1 | 4025 | 30 |
| Average | | 4075 (74% flow loss) | |
| | 1.3 | 5900 | 20 |
| | 1.3 | 6850 | 20 |
| | 1.3 | 5925 | 30 |
| | 1.3 | 5200 | 30 |
| Average | | 5969 (82% flow loss) | |

The results in Table 18 show that flow time increases with increasing ionomer weight percent in the coating solution and that the microporous membrane composite becomes more wettable as ionomer weight percent in the coating solution increases. The percent flow loss depends upon the percent ionomer used in the coating solution and ranged from an average 67% flow loss for 0.75 wt. percent 557 equivalent weight ionomer (S2), to an average 74% flow loss for 1 weight percent 557 equivalent weight ionomer (S2), to an average 82% flow loss for 1.3 weight percent 557 equivalent weight ionomer(S2).

Example 19

This example shows the properties including ion exchange capacity of a non-crosslinked ionomer coating a porous multilayer membrane support.

An Aquivion™ solution (a non-crosslinkable ionomer) diluted to 0.79% by weight that was in the ammonium form was used as received from Solvay Solexis. The diluted coating solution was coated onto 0.05 micron pore size PTFE membrane from Gore using squeeze bars. The coating was cured at 175-180° C.

A water autoclaved sample of this coated porous membrane appeared transparent. A dried sample of this coated porous membrane wets with a solution of 70 wt % to 75 wt % methanol in water.

Water flow time before and after autoclave at 11.5 psi positive pressure, 22.5° C., 500 ml volume of water was 465 and 487 seconds. Based on flow time after autoclave, average dewetting was 5.4%.

Average ion exchange capacity was 59.6 nmol/cm$^2$ or 0.03601 mmol/g.

Example 20

This example illustrates coating a filter device containing microporous membrane with a solution comprising ionomer and crosslinker and curing and activating the coating to crosslink it on the microporous membrane support surfaces and pores in the device.

A 4 inch Chemline® I filter device from Entegris Inc., Chaska, Minn., was used for coating. The microporous membrane support in the Chemline® I device was 20 nanometer pore size PTFE membrane. This microporous membrane support was coated with ionomer from Solvay Solexis as described in the General Synthetic procedures that had an equivalent weight of about 557 g/eq (S2). The coating solution contained 250 g (150 mls) of 4 wt % cross-linkable ionomer 557 g/eq solution (S2) and bis-olefin; Luperox 101 radical initiator (94% Arkema) 18.6 g in 100 g HFE-7100, Galden SV90 solvent—2150 g (1360 mls); the ionomer content was 0.4 wt % in the final fluorocarbon liquid composition coating solution. The coating solution was applied to the membrane in the filter housing under gravity flow and then air at 20 pounds per square inch pressure was passed through the device and out the drain hole for 1 minute. Curing was performed on a sealed device in an oven set at a temperature of 175° C. for 2.5 hours. Activation on the device prewet with IPA consisted of 1 liter 10% KOH fed under gravity flow. Plug the device and heat in an over set at a temperature of 80° C. for 16 hrs. Cool and drain the KOH and flush with water under gravity flow until the pH is less than 11. Flow 20% HNO$_3$ under gravity flow into the device and soak at room temperature room temperature for 2 hrs; wash and flush the filter device and membrane with water until the pH was greater than 3. Flow water, 1 liter, through the device. Plug and heat the device in an oven set at a temperature of 90° C. for 4 hours. Cool and drain the water. Measure the flow rate of the coated membrane, the microporous membrane composite, in the filter device. Drain and dry device in the oven set at a temperature of 105° C. for 2 days.

Water Flow testing of the microporous membrane support in filter device (20 nanometer pore size) before coating modification was 1.0 gallons per minute/pounds per square inch (GPM/psi) (1.02 psid/GPM). The microporous membrane support in the filter was pre-wet with IPA and flushed with water prior to this water flow test.

Water Flow testing of the microporous membrane composite in the filter device after coating with ionomer comprising solution, curing, activation, and extraction was performed. The device was prewet with IPA and flushed with water. Measured water flow was 0.6 GPM/psi (1.6 psid/GPM). This filter device unit was dried following this test.

Wettability/coating uniformity was measured on the dried device containing the microporous membrane composite. Flow 1.0 liter of a solution containing a 50 wt % Methanol/water mixture through the dried device. Drain and flush with ~3 liters of water and measure the water flow. The Water Flow after 50% MeOH/water wetting was 0.6 GPM/psi. This is about the same water flow as from the IPA prewet coated device and indicates that the coating was uniform throughout the microporous membrane support-uncoated or hydrophobic spots would not be wet by 50 wt percent MeOH/water solution and would have led to a water flow value lower than 0.6 GPM/psi.

The results show that fluorocarbon liquid composition derived from (S2) solution to give a 0.4 weight percent ionomer content could be used to uniformly coat the membrane support in a filter device. Other coating weight percent of ionomer, for example 0.3 wt % ionomer or 0.2 wt % ionomer, may also be used to coat the membrane support in a filter deveice and the coating uniformity verified by the test procedures set forth in this example.

Example 21

This example illustrates flow through coating of a microporous membrane supports with a fluorocarbon liquid composition solution comprising ionomer, radical initiator, and crosslinker, followed by curing and activation of the coating to crosslink it on the microporous membrane support surfaces and pores to form a microporous membrane composite.

Flow through surface modification was made on 20 nanometer pore sized PTFE membrane available from Gore. 47 mm diameter discs of the 20 nanometer PTFE microporous membrane were loaded into a 50 milliliter Savillex housing. The IPA Flow Time of unmodified microporous membrane support samples were also measured and recorded.

Fluorocarbon liquid compositions comprising ionomer solution(s), radical initiator, and crosslinker that were used to coat the microporous PTFE membrane supports were prepared according to the General Synthetic Methods using three different ionomer concentrations, 0.25 wt % ionomer and diolefin, 0.35 wt % ionomer and diolefin, and 0.45 wt % ionomer and diolefin (a coating solution as dilute as 0.1 wt % was used (for (S2*) that resulted in microporous membrane composiste with a flow loss avg. 25% after SM, that wet with 40 wt % MeOH in water, and had a color density (Cd) of 1.14).

Crosslinkable ionomer solutions containing diolefin, 4 wt % ionomer, were used as received from Solvay. These ionomer solutions were in Galden SV 90 solvent or HFE 7100 (3M) solvent. Radical initiator was 94% pure, Luperox-101 (Arkema). The ionomers in this example were solutions S1, S2, S2*, and S3 from the Table in Example 2.

Surface modification (SM) of a 47 millimeter diameter microporous PTFE membrane sample in the Savillex housing was made by filling the Savillex housing with coating solution of ionomer, radical initiator, and crosslinker and flowing the coating solution through the microporous membrane at 3.2 psi (22,063 Pa) positive pressure. Volume of the coating solution that passed through the microporous PTFE membrane for coating was less than 2.5 milliters. Excess fluorocarbon liquid composition coating solution was drained from the Savillex housing. The average mass of the coating on the microporous membrane composites in this example was determined to be about 3.5 percent of the total weight of the microporous membrane composite.

The coated membrane was cured and crosslinked by heating in an oven set at a temperature of 175° C. for 60 minutes (coated membrane support inside Savillex housing). Hydrolysis (Activation) of the cured coating was conducted by filling up the housing with 10% KOH, plugging both sides of the Savillex housing and hydrolyzing by heating in an oven at a temperature of 80° C. for 9 hours, the cooling to RT (room temperature), then draining the KOH, and washing with water until pH<11. (Activation) Regeneration was achieved by filling up the Savillex housing with 20% $HNO_3$, plugging the Savillex housing and soaking the membrane for two hours at room temperature. The 20% Nitric acid was drained from the housing and the membrane and housing flushed with water until pH>3. Extraction was done by filling up the housing with deionized water and placing in an oven at a temperature of 90° C. for 45-50 minutes, cooling to RT (room temperature) and draining the water. The membrane was dried by placing it in the Savillex housing in an oven at a temperature of 125° C. for about 30-45 minutes or until dry.

Coated membranes made by the methods in this Example with fluorocarbon liquid composition in HFE-7100 solvent, S1 and S3 in Table 3 of Example 2, resulted in coated membranes that IPA was unable to flow through—the samples were plugged (results not shown). Coated membranes made by the methods in this Example with fluorocarbon liquid composition in Galden SV-90 (Gal) solvent, S2 and S2* in Table 3 of Example 2, resulted in coated membranes that IPA was able to flow through. Measurements of the wettability (wt % of Methanol in water mixture to fully wet the membrane), Flow Time (sec) IPA flow time for 500 mls @14.2 psi through a 47 mm disc, % Flow loss, and Methylene Blue dye test (used to determine the presence of coating using Color density measurement) were made on the coated membrane samples made with ionomer in Galden SV-90. These results are in Table 19 and Table 20.

TABLE 19

Coated membranes made by the methods in this Example with fluorocarbon liquid composition in Galden SV-90 (Gal) solvent, S2. Measurements of the wettability (wt % of Methanol in water mixture to fully wet the membrane), Flow Time (sec) IPA flow time for 500 mls @14.2 psi through a 47 mm disc, and % Flow loss

| Run Order | Size nm Particles | Ionomer (%) Wt | IPA FT @14.2 psi/500 ml 0.02 um Base Membrane (sec) | IPA Flow Time @14.2 psi/500 ml X-link Membrane (sec) | Flow loss after SM % | % $CH_3OH$ (Fully Translucent) | % $CH_3OH$ Partial Wettability |
|---|---|---|---|---|---|---|---|
| 2 | 37/Gal | 0.45 | 730 | 4500 | 84 | 25% | 20% |
| 12 | 37/Gal | 0.45 | 720 | 4450 | 84 | 20% | |
| 18 | 37/Gal | 0.45 | 830 | 4075 | 80 | 25% | 20% |
| Average | | | | | 82 | | |
| 5 | 37/Gal | 0.35 | 640 | 2050 | 69 | 25% | 20% |
| 10 | 37/Gal | 0.35 | 740 | 1925 | 62 | 30% | 25% |
| 15 | 37/Gal | 0.35 | 750 | 1850 | 59 | 25% | |
| Average | | | | | 63 | | |
| 6 | 37/Gal | 0.25 | 820 | 1500 | 45 | 30% | |
| 9 | 37/Gal | 0.25 | 860 | 1475 | 42 | 30% | |
| 16 | 37/Gal | 0.25 | 700 | 1125 | 38 | 30% | 25% |
| Average | | | | | 42 | | |

TABLE 20

Coated membranes made by the methods in this Example with fluorocarbon liquid composition in Galden SV-90 (Gal) solvent, S2*. Measurements of the wettability (wt % of Methanol in water mixture to fully wet the membrane), Flow Time (sec) IPA flow time for 500 mls @14.2 psi through a 47 mm disc, and % Flow loss

| Run Order | Size nm Particles | Ionomer (%) Wt | IPA FT @14.2 psi/500 ml 0.02 um Base Membrane (sec) | IPA Flow Time @14.2 psi/500 ml X-link Membrane (sec) | Flow loss after SM % | % $CH_3OH$ (Fully Translucent) | % $CH_3OH$ Partial Wettability |
|---|---|---|---|---|---|---|---|
| 2 | 16/Gal | 0.45 | 858 | 1575 | 46 | 25% | |
| 10 | 16/Gal | 0.45 | 704 | 1400 | 50 | 20% | |
| 18 | 16/Gal | 0.45 | 877 | 2000 | 56 | 20% | |
| Average | | | | | 50 | | |
| 5 | 16/Gal | 0.35 | 717 | 1325 | 46 | 25% | |
| 11 | 16/Gal | 0.35 | 750 | 1363 | 45 | 30% | 25% |
| 16 | 16/Gal | 0.35 | 816 | 1375 | 41 | 30% | 25% |
| Average | | | | | 44 | | |

TABLE 20-continued

Coated membranes made by the methods in this Example with fluorocarbon liquid composition in Galden SV-90 (Gal) solvent, S2*. Measurements of the wettability (wt % of Methanol in water mixture to fully wet the membrane), Flow Time (sec) IPA flow time for 500 mls @14.2 psi through a 47 mm disc, and % Flow loss

| Run Order | Size nm Particles | Ionomer (%) Wt | IPA FT @14.2 psi/500 ml 0.02 um Base Membrane (sec) | IPA Flow Time @14.2 psi/500 ml X-link Membrane (sec) | Flow loss after SM % | % CH₃OH (Fully Translucent) | % CH₃OH Partial Wettability |
|---|---|---|---|---|---|---|---|
| 3 | 16/Gal | 0.25 | 650 | 1075 | 40 | 30% | 25% |
| 7 | 16/Gal | 0.25 | 639 | 1125 | 43 | 25% | |
| 17 | 16/Gal | 0.25 | 817 | 1250 | 35 | 30% | 25% |
| Average | | | | | 39 | | |

The results in this Example show that the percent flow loss after surface modification ranged from 35% to 84% for coated membranes in this example. The percent flow loss after surface modification for the 16 nanometer size coating particle, see Table 20, was between about 35 percent and 56% depending upon the ionomer weight percent in the coating; for the same ionomer weight percent, the flow loss was less on average for the 16 nanometer particles (Table 20) than for the 37 nanometer particles (Table 19).

Methylene blue dye test results are shown in Table 21 below for the membranes coated with ionomer in Galden SV-90 solvent. Values of blue dye Color density higher than 1 are an indication of very good coating presence. The results below are based on an average of 10 densitometric measurements per microporous membrane composite sample. The results in the Table below show the presence of coating on all samples.

TABLE 21

Methylene blue dye color density (Cd) results for fluorocarbon liquid compositions comprising S2* and S2 solutions in Galden SV-90 solvent.

| Ionomer Concentration Wt (%) | S2* (555 g/eq) 16 nm Cd | S2 (557 g/eq) 37 nm Cd |
|---|---|---|
| 0.25 | 1.28 | 1.23 |
| 0.35 | 1.32 | 1.27 |
| 0.45 | 1.40 | 1.39 |

Fluorocarbon liquid compositions comprising various sized ionomer particles in various solvents can be distributed on surfaces and pores of a microporous membrane support for example by roller coating to give microporous composite materials with flow loss of 82% or less as shown in previous examples. The results of this example illustrate that the solvent properties are important in providing fluorocarbon liquid compositions with ionomer particles of about 50 nanometers or less that can be used with a flow through coating method to form microporous membrane composites that have a flow loss of about 82% or less. The 16 nm and 37 nm ionomer particles dispersed in a solvent like Galden SV-90 in this example were able to be used with the flow through distribution and resulted in microporous membrane composites with a flow loss of less than about 82%. Using the methods and materials of this example, other suitable solvents for the fluorocarbon liquid compositions could be determined. The microporous membrane composites in this example with flow loss of less than about 82% after surface modification with crosslinked coating on the membrane support were also wettable with solutions containing about 20 wt % methanol in water to about 30 weight percent methanol in water. Higher ionomer concentration, 0.45 wt % versus 0.25 wt % made slightly better wetting coated microporous membrane composites but at the expense of higher flow loss.

Example 22

This example shows that the microporous membrane composite of Example 17 is stable in corrosive environments like an SPM bath. The SPM test bath in this example is a 5:1 by volume mixture of sulfuric acid and hydrogen peroxide. This SPM cleaning bath mixture was fed through the coated Chemline® filter and the temperature of the bath adjusted to a prescribed processing temperature of about 150° C. Flow rate of the SPM bath through the Chemline® filter was about 10 to 11 liters per minute.

Figure 3:
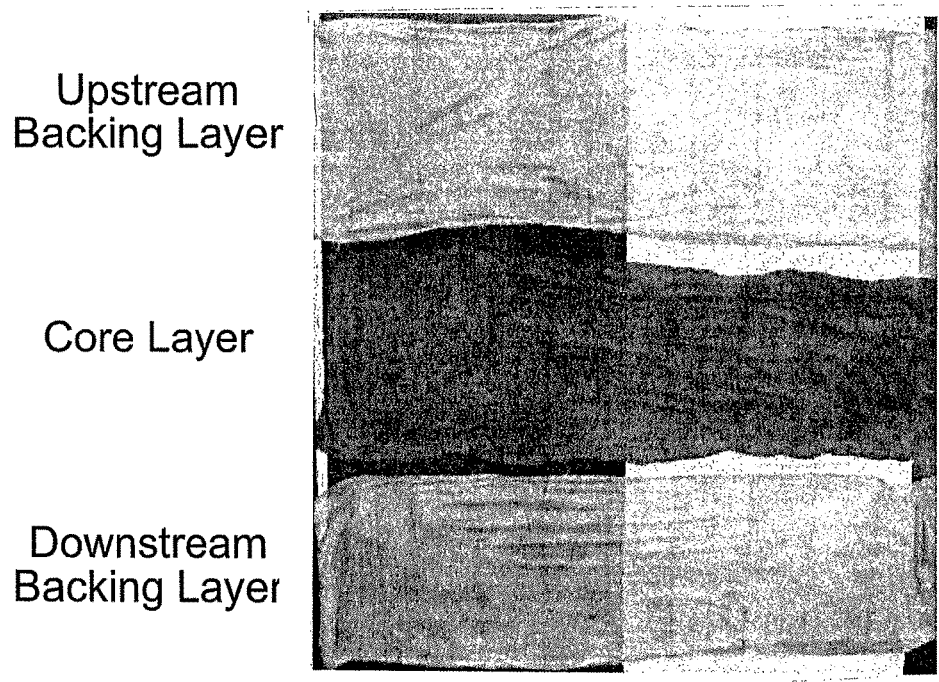
FIG. 3 A line drawing representation of a photograph of the upstream backing layer, core layer, and downstream backing layer that have each stained with methylene blue dye from Example 22. The shading uniformity and shading density (darker shade of grey, high density, represents represents a darker blue color from the original photograph), represents the blue color for these layers in the photograph.

After about 52 hours of the the SPM treatment (8 days at 6.5 hours per day) the coated Chemline® filter was cut open and the components stained with methylene blue as described herein. FIG. 3 is a drawing representing a photograph that shows the methylene blue dye stained elements of the coated Chemline® filter of Example 20 including the upstream backing, core membrane layer, and downstream backing.

The representative illustration in FIG. 3 shows uniform color of the membrane with the methylene blue dye; the uniformity and shading intensity indicate that the membrane composite is non-dewetting. This examples shows that the microporous membrane composite coating is stable in an SPM bath and that the coating is stable even after extended use in a corrosive environment like an SPM bath.

These non-limiting examples show that non-dewetting microporous membrane composites coated with a cross-linked fluorinated ionomer can be made that are wettable with solutions containing methanol and water, that have a densitometer readings after treatment with hot fluorosurfactant in IPA that are within ±9% of the densitometer readings of the coated membrane before treatment with hot fluorosurfactant in IPA, and that these microporous membranes composites have a flow loss (based on flow time for 500 milliliters isopropyl alcohol at about 14.2 psi (about 97905 Pa) pressure) that on average is 82% or less based on the flow time of the uncoated microporous membrane support. Further, these microporous membrane composites comprise a microporous membrane support having pores of less than 0.45 micron and an amount of a coating comprising an amorphous crosslinked fluorinated ionomer on surfaces including pores of the microporous membrane support. Some of the microporous membrane composites have ion exchange capacities of greater than about 60 nanomoles/square centimeter, in some cases an ion exchange capacity of 95 nanomoles/square centimeter or more, and in some versions an ion exchange capacity of 160 nanomoles/square centimeter or more. In some versions of the invention the microporous membrane composites have an ion exchange capacity between 99 nanomoles/square cemtimeter and 161 nanomoles/square centimeter.

These non-dewetting microporous composites can be made with a range of equivalent weights of the ionomer(s) and a range of amounts of the ionomer(s) in the coating solution. Ionomers with equivalent weights between 380 g/eq to 620 g/eq, in some cases between 458 g/eq and 597 g/eq, or in other versions between about 460 g/eq and about 600 g/eq can be used. Depending on the equivalent weight, flow loss and wetting characteristics, the concentration of ionomer in the coating solution can be in the range from about 0.1% by weight to about 3.5% by weight, in some versions 0.25% by weight to 3.5% by weight, and in still other versions between about 0.25 wt % and about 3.5 wt %, and in yet still other versions between 1 wt % to 2 wt %, or about 1 wt % to about 2 wt % of ionomer.

The microporous membrane composites in these examples may be combined with various supports and in various configurations in filter devices. The microporous membrane composite can be pleated with one or more support layers or nets, and potted with cage, support, and endcap structures to form various filter cartridges. The cartridges may be replaceable or they may be bonded into a housing. In cases where the microporous membrane composite is a hollow fiber, one or more hollow fibers may be potted to form a device. Filters comprising the microporous membrane composite can be incorporated into various gas or liquid delivery systems, for example a photoresist or developer or antireflective coating dispense pump and used to filter such liquids prior to contacting a substrate. These dispense systems may include a dispense pump fluidly connected to the filter and a valve or nozzle at the dispense point. Alternatively filters comprising the microporous membrane composites may be included in recirculating cleaning tools or in single wafer cleaning tools that include a pump, the filter, and a tank containing the cleaning fluid.

Although the present invention has been described in considerable detail with reference to certain versions and examples thereof, other versions are possible. Therefore the spirit and scope of the appended claims should not be limited to the description and the versions contain within this specification.

What is claimed is:

1. A microporous membrane composite comprising:
   a microporous membrane support comprising a cross-linked fluorinated ionomer coating on the surfaces and pores of the microporous membrane support, wherein the fluorinated ionomer coating comprises units from copolymerization of:
   i) tetrafluoroethylene;
   ii) fluorinated monomer units containing ethylenic groups and functional groups chosen from $SO_2F$, —COOR, —COF or combinations of these, wherein R is a $C_1$ to $C_{20}$ alkyl radical or a $C_6$ to $C_{20}$ aryl radical;
   iii) monomeric units deriving from a bis-olefin, chosen from formulae (OF-1), (OF-2), or (OF-3) where:

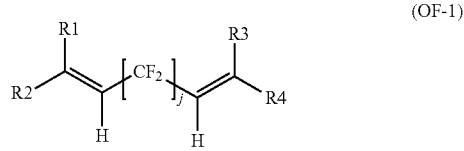
(OF-1)

wherein j is an integer between 2 and 10, and R1, R2, R3, R4, individually equal or different from each other, are H, F or $C_1$ to $C_5$ alkyl or (per)fluoroalkyl group;

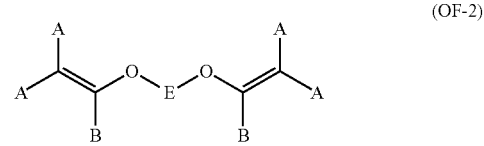
(OF-2)

wherein each of A, equal or different from each other and at each occurrence, is independently F, Cl, or H; each of B, equal or different from each other and at each occurrence, is independently F, Cl, H or ORB, wherein RB is a branched or straight chain alkyl radical which can be partially, substantially or completely fluorinated or chlorinated; E is a divalent group having 2 to 10 carbon atom, optionally fluorinated, which may be inserted with ether linkages;

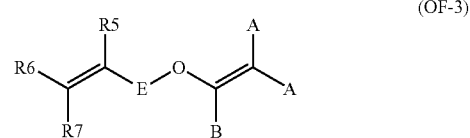
(OF-3)

wherein E, A and B have the same meaning as above defined; R5, R6, R7, independently equal or different from each other, are H, F or C1-5 alkyl or (per) fluoroalkyl group; and iv) a compound having the formula $R_f(I)_x(Br)_y$, wherein where $R_f$ is a fluoroalkyl or (per)fluoroalkyl or a (per)fluorochloroalkyl group having from 1 to 8 carbon atoms, and wherein x and y are integers from 0 to 2, with $1 \leq x+y \leq 2$;

wherein the fluorinated ionomer coating has an equivalent weight of between 380 g/eq and 620 g/eq, wherein the fluorinated ionomer coating is between about 25 weight percent and about 30 weight percent of the microporous membrane composite, wherein the microporous membrane composite has a permeability of about 876 l/atm*hr*m² to about 2852 l/atm*hr*m² at 22.5° C. measured on 47 millimeter diameter microporous membrane composite samples, and wherein the microporous membrane support has a rated pore size of 0.2 microns or less.

2. The microporous membrane composite of claim 1, wherein the microporous membrane composite has an ion exchange capacity of 95 nanomoles/cm² or more.

3. The microporous membrane composite of claim 1, wherein the microporous membrane support is a multilayer membrane.

4. The microporous membrane composite of claim 1, wherein the microporous membrane composite has a mean densitometer value determined by densitometer readings of a methylene blue dye stained sample of said microporous membrane composite, said mean densitometer value is within ±9% of a mean densitometer value determined by said densitometer of said methylene blue dye stained microporous membrane composite after 4 or more hours flow through contact with isopropyl alcohol containing 5000 ppm fluorosurfactant at a temperature of between 70° C. and 80° C. at a flow rate of at least 80 ml/min through a 47 millimeter diameter sample of said methylene blue dye stained microporous membrane composite.

5. The microporous membrane composite of claim 1, wherein the microporous membrane composite has a mean densitometer value determined by densitometer readings of a methylene blue dye stained sample of said microporous membrane composite, said mean densitometer value does not differ at the 95% confidence limit by a Student-t test from a mean densitometer value determined by said densitometer of said methylene blue dye stained sample of said microporous membrane composite after 4 or more hours flow through contact with isopropyl alcohol containing 5000 ppm fluorosurfactant at a temperature of between 70° C. and 80° C. at a flow rate of at least 80 ml/min through a 47 millimeter diameter sample of said methylene blue dye stained microporous membrane composite.

6. The microporous membrane composite of claim 1, wherein the microporous membrane support has pores 0.1 micron or smaller.

7. A method of making a microporous membrane composite, comprising:
  a) coating a microporous membrane with a fluorocarbon liquid composition comprising a fluorocarbon liquid medium containing a fluorinated ionomer dissolved or dispersed therein to thereby form a coated microporous membrane composite, the fluorinated ionomer having iodine and/or bromine atoms at a terminal position, at least 90% by weight of the fluorinated ionomer consisting in particles of size lower than 200 nm, wherein the fluorinated ionomer comprises units from copolymerization of:
    i) tetrafluoroethylene;
    ii) fluorinated monomer units containing ethylenic groups and functional groups chosen from —SO$_2$F, —COOR, —COF or combinations of these, wherein R is a $C_1$ to $C_{20}$ alkyl radical or a $C_6$ to $C_{20}$ aryl radical;
    iii) monomeric units deriving from a bis-olefin, chosen from formulae (OF-1), (OF-2), or (OF-3) where:

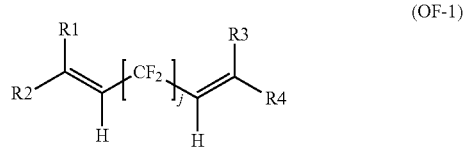

(OF-1)

wherein j is an integer between 2 and 10, and R1, R2, R3, R4, individually equal or different from each other, are H, F or $C_1$ to $C_5$ alkyl or (per)fluoroalkyl group;

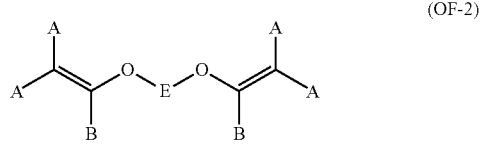

(OF-2)

wherein each of A, equal or different from each other and at each occurrence, is independently F, Cl, or H; each of B, equal or different from each other and at each occurrence, is independently F, Cl, H or ORB, wherein RB is a branched or straight chain alkyl radical which can be partially, substantially or completely fluorinated or chlorinated; E is a divalent group having 2 to 10 carbon atom, optionally fluorinated, which may be inserted with ether linkages;

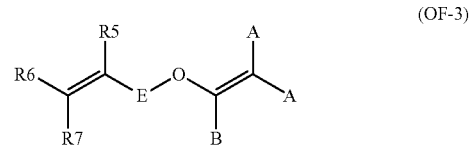

(OF-3)

wherein E, A and B have the same meaning as above defined; R5, R6, R7, independently equal or different from each other, are H, F or C1-5 alkyl or (per)fluoroalkyl group; and
    iv) a compound having the formula $R_f(I)_x(Br)_y$, wherein where $R_f$ is a fluoroalkyl or (per)fluoroalkyl or a (per)fluorochloroalkyl group having from 1 to 8 carbon atoms, and wherein x and y are integers from 0 to 2, with $1 \leq x+y \leq 2$;
  wherein the fluorocarbon liquid medium comprises a mixture of perfluoropolyethers, said perfluoropolyethers having the general formula $F_3C$—O—[$CF_2$—$CF(CF_3)$—O]$_n$—[$CF_2$—O]$_m$—$CF_3$ wherein m and n are integers, being n>0 and m≥0, said perfluoropolyethers having molecular weight between 300 atomic mass units (amu) and 600 amu, said mixtures having prevailing average boiling points between 55° C. and 135° C. and an average ratio between the indexes m and n (m/n) below 0.05;
  wherein the fluorinated ionomer has an equivalent weight of between 380 g/eq and 620 g/eq, and
  b) crosslinking the coated microporous membrane by heating the coated microporous membrane to form a coated, crosslinked microporous membrane composite;
    wherein the fluorinated ionomer coating is between about 25 weight percent and about 30 weight percent of the microporous membrane composite,
    wherein the microporous membrane composite has a permeability of 876 l/atm*hr*m$^2$ to 2852 l/atm*hr*m$^2$ at 22.5° C. measured on 47 millimeter diameter microporous membrane composite samples, and
    wherein the microporous membrane has a rated pore size of 0.2 microns or less.

8. The method of claim 7, further comprising activating the functional groups chosen from —SO$_2$F, —COOR, —COF or combinations of these by contacting sequentially the coated, crosslinked microporous membrane with base, acid, and water.

9. The method of claim 8, wherein the base is KOH.

10. The method of claim 8, wherein the acid is HNO$_3$.

11. The method of claim 8, wherein the acid is HCl.

12. The method of claim 8, wherein the acid is HNO$_3$ and HCl.

13. The microporous membrane composite of claim 1, wherein the microporous membrane composite is non-dewetting after autoclave treatment in water.

14. The microporous membrane composite of claim 1, wherein the microporous membrane composite is wettable with a solution containing methanol in an amount of less than 80 wt % methanol in water.

15. The microporous membrane composite of claim 1, wherein the microporous membrane composite has a flow loss of 82% or less compared to the microporous membrane support when measured using 500 milliliters of isopropyl alcohol at a pressure of 97,905 Pa.

16. The microporous membrane composite of claim 1, wherein the microporous membrane support has a surface area of 10 meter$^2$/gram.

17. The microporous membrane composite of claim 1, wherein the microporous membrane support has a pore size of 0.1 micron.

18. The microporous membrane composite of claim 17, wherein the microporous membrane composite has a permeability of about 2852 l/atm*hr*m2 at 22.5° C. measured on 47 millimeter diameter microporous membrane composite samples.

19. The microporous membrane composite of claim 1, wherein the microporous membrane composite is non-dewetting after exposure to a flow of a mixture of sulfuric acid and hydrogen peroxide.

* * * * *